United States Patent
Akimoto et al.

(10) Patent No.: US 9,681,460 B2
(45) Date of Patent: Jun. 13, 2017

(54) WIRELESS COMMUNICATION SYSTEM, BASE STATION APPARATUS AND MOBILE STATION APPARATUS

(71) Applicant: Huawei Technologies Co., Ltd., Shenzhen (CN)

(72) Inventors: Yosuke Akimoto, Osaka (JP); Tatsushi Aiba, Osaka (JP); Shohei Yamada, Osaka (JP); Hiroshi Katsuragawa, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/098,024

(22) Filed: Dec. 5, 2013

(65) Prior Publication Data

US 2014/0092881 A1    Apr. 3, 2014

Related U.S. Application Data

(63) Continuation of application No. 12/673,036, filed on Feb. 11, 2010, now Pat. No. 8,626,217, which is a
(Continued)

(30) Foreign Application Priority Data

Sep. 26, 2007    (JP) ................................ 2007-249977

(51) Int. Cl.
*H04W 72/08*    (2009.01)
*H04L 5/00*    (2006.01)
(Continued)

(52) U.S. Cl.
CPC ......... *H04W 72/085* (2013.01); *H04L 5/0007* (2013.01); *H04L 5/0053* (2013.01);
(Continued)

(58) Field of Classification Search
CPC ............ H04W 72/085; H04W 72/0413; H04L 5/0007; H04L 5/0053; H04L 5/0057; H04L 5/0082; H04L 1/0026; H04L 1/0027
(Continued)

(56) References Cited

U.S. PATENT DOCUMENTS 5,828,669 A * 10/1998 Yamamoto .......... H04J 14/0227
370/412
6,078,415 A * 6/2000 Yamamoto .......... H04J 14/0227
398/1

(Continued)

FOREIGN PATENT DOCUMENTS

CN    101040461 A    9/2007
EP    1569492 A2    8/2005
(Continued)

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36.213, V8.0.0, Sep. 2007, 13 pages.
(Continued)

*Primary Examiner* — Hai V Nguyen
(74) *Attorney, Agent, or Firm* — Slater Matsil, LLP

(57) ABSTRACT

An apparatus for signal processing includes a scheduling unit and a transmitting unit. The scheduling unit is configured to assign one physical uplink control channel resource for transmissions of first group feedback information and second group feedback information. A first periodicity corresponds to the first group feedback information and a second periodicity corresponds to the second group feedback information. The transmitting unit is configured to transmit a transmission parameter of the first periodicity and the second periodicity and information of the assigned
(Continued)

physical uplink control channel resource. The first group feedback information includes a transmission of reception quality information and transmission signal precoding information and the second group feedback information includes a transmission of transmission signal sequence information.

12 Claims, 17 Drawing Sheets

Related U.S. Application Data continuation of application No. PCT/JP2008/067161, filed on Sep. 24, 2008.

(51) Int. Cl.
*H04L 1/00* (2006.01)
*H04W 72/04* (2009.01)

(52) U.S. Cl.
CPC .......... *H04L 5/0057* (2013.01); *H04L 5/0082* (2013.01); *H04L 1/0026* (2013.01); *H04L 1/0027* (2013.01); *H04W 72/0413* (2013.01)

(58) Field of Classification Search
USPC ............... 455/509; 370/329, 336; 714/758
See application file for complete search history.

(56) References Cited

U.S. PATENT DOCUMENTS

| | | | | |
|---|---|---|---|---|
| 7,440,757 B2* | 10/2008 | Kwon | H04W 36/12 | 370/331 |
| 7,630,732 B2* | 12/2009 | Pan | H01Q 3/2605 | 455/126 |
| 7,684,762 B2* | 3/2010 | Ihm | H04L 5/0044 | 370/328 |
| 7,826,439 B2 | 11/2010 | Ihm et al. | | |
| 7,860,077 B2* | 12/2010 | Ihm | H04L 5/0044 | 370/329 |
| 7,860,078 B2* | 12/2010 | Ihm | H04L 5/0044 | 370/329 |
| 7,864,746 B2* | 1/2011 | Ihm | H04L 5/0044 | 370/329 |
| 7,869,419 B2* | 1/2011 | Ihm | H04L 5/0044 | 370/329 |
| 7,873,023 B2* | 1/2011 | Ihm | H04L 5/0044 | 370/329 |
| 7,885,247 B2 | 2/2011 | Ihm et al. | | |
| 7,899,015 B2* | 3/2011 | Bottomley | H04W 4/18 | 370/328 |
| 8,005,154 B2* | 8/2011 | Kwon | H04L 25/03343 | 375/260 |
| 8,031,795 B2* | 10/2011 | Pan | H04B 7/0417 | 370/252 |
| 8,054,893 B2* | 11/2011 | Mizusawa | H04L 5/0037 | 370/241 |
| 8,171,372 B2* | 5/2012 | Pan | H04L 1/1861 | 341/94 |
| 8,199,721 B2* | 6/2012 | Jung | H04B 7/15542 | 370/332 |
| 8,259,885 B2* | 9/2012 | Sato | H04L 1/0026 | 375/219 |
| 8,275,084 B2* | 9/2012 | Sato | H04L 1/0026 | 375/219 |
| 8,284,731 B2* | 10/2012 | Shitara | H04B 7/2615 | 370/330 |
| 8,295,253 B2* | 10/2012 | Chen | H04L 1/1664 | 370/235 |
| 8,295,840 B2* | 10/2012 | Ishii | H04B 7/0654 | 370/331 |
| 8,369,860 B2* | 2/2013 | Zhang | H04L 1/0015 | 370/330 |
| 8,437,705 B2* | 5/2013 | Khoshnevis | H04L 1/0026 | 455/452.1 |
| 8,457,235 B2* | 6/2013 | Ko | H04B 7/0413 | 375/267 |
| 8,488,453 B2* | 7/2013 | Zhang | H04W 72/1257 | 370/230 |
| 8,503,407 B2* | 8/2013 | Seo | H04B 7/0634 | 343/725 |
| 8,626,217 B2* | 1/2014 | Akimoto | H04L 5/0007 | 370/329 |
| 8,817,734 B2* | 8/2014 | Khoryaev | H04W 52/243 | 370/252 |
| 8,958,379 B2* | 2/2015 | He | H04W 52/243 | 370/252 |
| 9,125,229 B2* | 9/2015 | Tesanovic | H04B 7/0623 | |
| 9,154,267 B2* | 10/2015 | He | H04W 28/08 | |
| 9,198,050 B2* | 11/2015 | Hultell | H04B 7/0404 | |
| 9,209,955 B2* | 12/2015 | Damnjanovic | H04L 5/001 | |
| 9,247,532 B2* | 1/2016 | Kim | H04L 5/001 | |
| 9,252,930 B2* | 2/2016 | Qu | H04L 5/0023 | |
| 9,271,173 B2* | 2/2016 | Xu | H04W 24/08 | |
| 9,439,095 B2* | 9/2016 | He | H04W 52/0258 | |
| 9,456,358 B2* | 9/2016 | Chen | H04W 24/02 | |
| 9,467,819 B2* | 10/2016 | Niu | H04W 4/06 | |
| 2003/0193969 A1 | 10/2003 | Pecen et al. | | |
| 2005/0014474 A1 | 1/2005 | Jitsukawa et al. | | |
| 2005/0083900 A1 | 4/2005 | Wanguemert Perez et al. | | |
| 2006/0111129 A1 | 5/2006 | Ihm et al. | | |
| 2006/0165188 A1 | 7/2006 | Wunder et al. | | |
| 2006/0171417 A1 | 8/2006 | Ihm et al. | | |
| 2006/0172738 A1* | 8/2006 | Kwon | H04W 36/12 | 455/439 |
| 2006/0239272 A1 | 10/2006 | Heidari-Bateni et al. | | |
| 2007/0041378 A1 | 2/2007 | Ihm et al. | | |
| 2007/0217540 A1* | 9/2007 | Onggosanusi | H04B 7/0417 | 375/267 |
| 2007/0220151 A1* | 9/2007 | Li | H04L 5/0007 | 709/226 |
| 2007/0280116 A1* | 12/2007 | Wang | H04B 7/0417 | 370/236 |
| 2008/0045228 A1* | 2/2008 | Zhang | H04L 1/0015 | 455/450 |
| 2008/0198800 A1* | 8/2008 | Zhang | H04W 72/1257 | 370/329 |
| 2008/0310540 A1* | 12/2008 | Tiirola | H04J 13/00 | 375/267 |
| 2009/0006925 A1* | 1/2009 | Pan | H04L 1/1861 | 714/758 |
| 2009/0207831 A1 | 8/2009 | Ihm et al. | | |
| 2010/0067475 A1 | 3/2010 | Ihm et al. | | |
| 2010/0118822 A1* | 5/2010 | Ihm | H04L 5/0044 | 370/329 |
| 2010/0118823 A1* | 5/2010 | Ihm | H04L 5/0044 | 370/329 |
| 2010/0118824 A1* | 5/2010 | Ihm | H04L 5/0044 | 370/329 |
| 2100/0118821 | 5/2010 | Ihm et al. | | |
| 2010/0183086 A1* | 7/2010 | Ko | H04B 7/0413 | 375/260 |
| 2010/0189049 A1 | 7/2010 | Lim et al. | | |
| 2010/0202414 A1* | 8/2010 | Malladi | H04L 1/0029 | 370/335 |
| 2010/0202553 A1 | 8/2010 | Kotecha et al. | | |
| 2010/0208656 A1* | 8/2010 | Oh | H04W 16/12 | 370/328 |
| 2010/0248733 A1* | 9/2010 | Sato | H04L 1/0026 | 455/452.1 |
| 2011/0134782 A1* | 6/2011 | Akimoto | H04L 1/0026 | 370/252 |
| 2011/0183697 A1* | 7/2011 | Akimoto | H04L 5/0007 | 455/509 |
| 2011/0194499 A1* | 8/2011 | Aiba | H04L 1/1822 | 370/328 |
| 2011/0194516 A1* | 8/2011 | Aiba | H04L 1/0026 | 370/329 |
| 2011/0261759 A1* | 10/2011 | Yamada | H04W 72/0453 | 370/328 |

(56) References Cited

U.S. PATENT DOCUMENTS

| | | | |
|---|---|---|---|
| 2011/0281615 A1* | 11/2011 | Yamada | H04W 36/0094 455/524 |
| 2011/0317577 A1* | 12/2011 | Yamada | H04W 24/10 370/252 |
| 2012/0009959 A1* | 1/2012 | Yamada | H04B 7/0413 455/507 |
| 2012/0014348 A1 | 1/2012 | Tanno et al. | |
| 2012/0033571 A1* | 2/2012 | Shimezawa | H04B 7/026 370/252 |
| 2012/0069815 A1* | 3/2012 | Aiba | H04L 5/001 370/329 |
| 2012/0140712 A1* | 6/2012 | Yamada | H04W 72/042 370/329 |
| 2012/0182949 A1* | 7/2012 | Aiba | H04L 5/001 370/329 |
| 2013/0091401 A1* | 4/2013 | Pan | H04L 1/1861 714/755 |
| 2013/0142031 A1* | 6/2013 | Wu | H04B 7/0417 370/203 |
| 2013/0195055 A1* | 8/2013 | Zhang | H04L 1/0015 370/329 |

FOREIGN PATENT DOCUMENTS

| | | |
|---|---|---|
| EP | 1615356 A2 | 1/2006 |
| JP | 2006352382 A | 12/2006 |
| WO | 03049322 A1 | 6/2003 |
| WO | 2006043773 A2 | 4/2006 |
| WO | 2006134950 A1 | 12/2006 |

OTHER PUBLICATIONS

Canadian Office Action received in Application No. 2,695,529 mailed Aug. 1, 2012, 6 pages.

Chinese Office Action received in Application No. 200880108594.0 mailed Jul. 2, 2012, 5 pages.

Canadian Office Action received in Application No. 2,695,529 mailed May 13, 2013, 4 pages.

Extended European Search Report received in Application No. 11006176.9-2412 mailed Nov. 15, 2011, 12 pages.

Extended European Search Report received in Application No. 08834345.4-2412 mailed Nov. 18, 2011, 12 pages.

International Search Report received in Application No. PCT/JP2008/067161 mailed Nov. 25, 2008, 1 pages.

Japanese Office Action received in Application No. 201018501 downloaded from mhtml:file:// C:\Users\100229541\AppData\Local\Temp\Rar$D137.687\00 on Mar. 6, 2014, 2 pages.

Japanese Office Action received in Application No. 2009-173262 downloaded from mhtml:file:// C:\Users\100229541\AppData\Local\Temp\Rar$DI12.125\00 on Mar. 6, 2014, 3 pages.

Notice of Allowance received in U.S. Appl. No. 12/673,036 mailed Sep. 3, 2013, 14 pages.

NTT DoCoMo, et al., "Group-wised Freequency Resource Allocation for Frequency Domain Channel-dependent Scheduling in SC-Based E-UTRA Uplink," 3GPP TSG-RAN WG1 Meeting #46, R1-062104, Tallinn, Estonia, Aug. 28-Sep. 1, 2006, 13 pages.

Texas Instruments, "Views on MIMO-Related UE Feedback," 3GPP TSG RAN WG1 47bis, R1-070273, Sorrento, Italy, Jan. 15-19, 2007, 3 pages.

Philips, "Control of CQI feedback signalling in E-UTRA," 3GPP TSG RAN WG1 Meeting #48bis, R1-071400, St. Julians, Malta, Mar. 26-30, 2007, 3 pages.

Texas Instruments, "Design Aspects of MIMO-Related UE Feedback," 3GPP TSG RAN WG1 49, R1-072213, Kobe, Japan, Mar. 26-30, 2007, 4 pages.

Nortel, "Uplink Signaling Support for DL Rank Adaptation with Fixed Precoding," 3GPP TSG-RAN Working Group 1 Meeting #50, R1-073291, Athens, Greece, Aug. 20-24, 2007, 4 pages.

Texas Instruments, "Design Aspects of UE Feedback," #GPP TSG RAN WG1 50, R1-073423, Athens, Greece, Aug. 20-24, 2007, 7 pages.

Texas Instruments, "PMI Feedback Rate-System Simulation," 3GPP TSG RAN WG1 50, R1-073426, Athens, Greece, Aug. 20-24, 2007, 5 pages.

Huawei, "Feedback method for CQI, PMI and rank," TSG RAN WG1 meeting #50, R1-073512, Athens, Greece, Aug. 20-24, 2007, 3 pages.

Panasonic, et al., "Rank feedback in downlink MIMO," 3GPP TSG RAN WG1 Meeting #50, R1-073633, Athens, Greece, Aug. 20-24, 2007, 8 pages.

LG Electronics Inc., "Issue on periodic measurement reporting," 3GPP TSG RAN WG2 #57bis, Tdoc R2-071448, St Julian's, Malta, Mar. 26-30, 2007, 3 pages.

Alcatel-Lucent, "CQI Feedback Agreements and Proposals," 3GPP TSG-RAN#59 WG 2 LTE, R2-073144, Aug. 20-24, 2007, 5 pages.

United States Office Action received in U.S. Appl. No. 12/673,036 mailed May 13, 2013, 17 pages.

United States Office Action received in U.S. Appl. No. 13/090,061 mailed Jun. 24, 2011, 14 pages.

United States Office Action received in U.S. Appl. No. 12/673,036 mailed Nov. 8, 2012, 15 pages.

United States Office Action received in U.S. Appl. No. 13/090,061 mailed Apr. 19, 2013, 18 pages.

3GPP, 3rd Generation Partnership Project; Technical Specification Group Radio Access Network; Evolved Universal Terrestrial Radio Access (E-UTRA); Physical layer procedures (Release 8), 3GPP TS 36.213 V2.1.0, Sep. 2007, 14 pages.

* cited by examiner

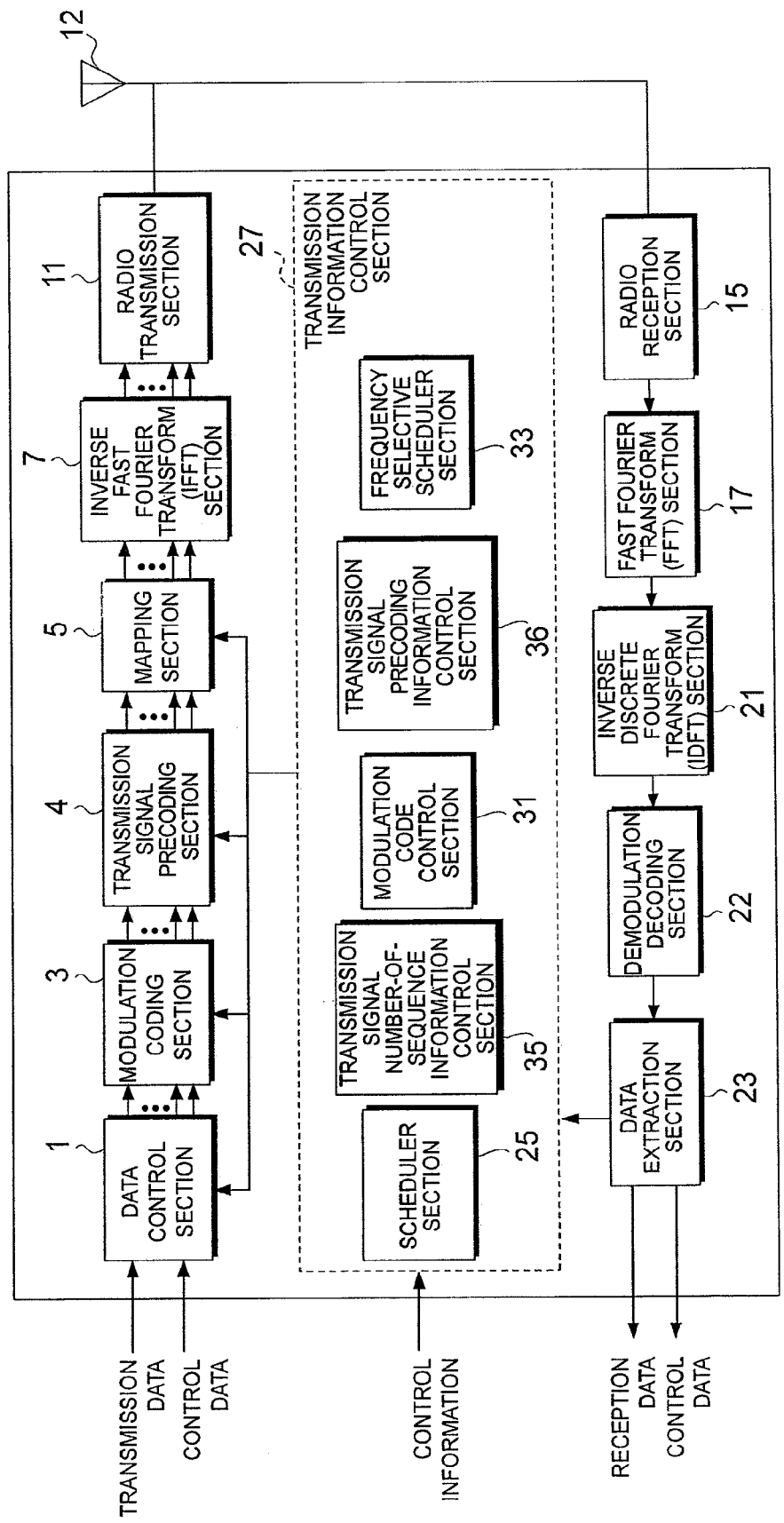

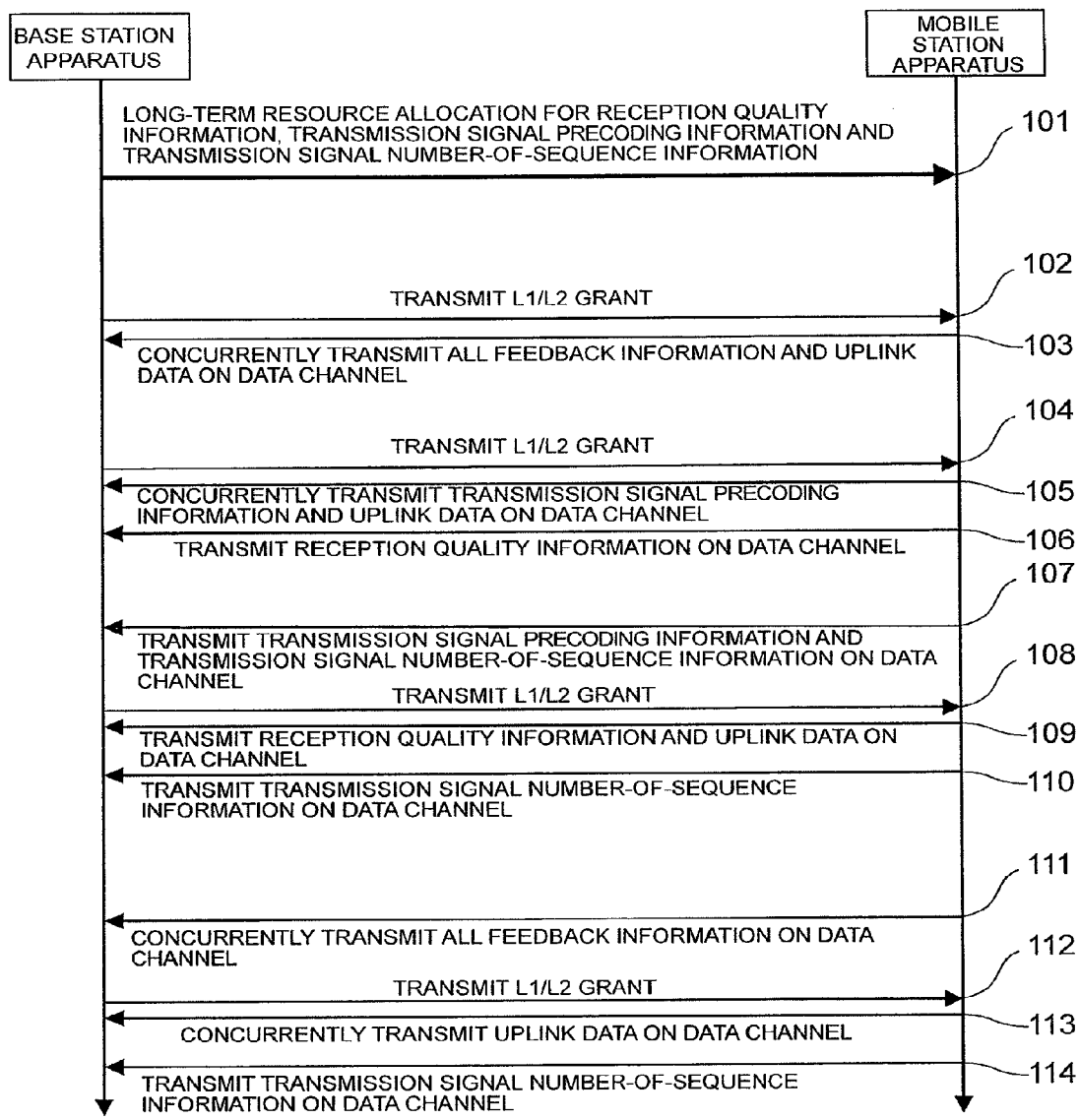

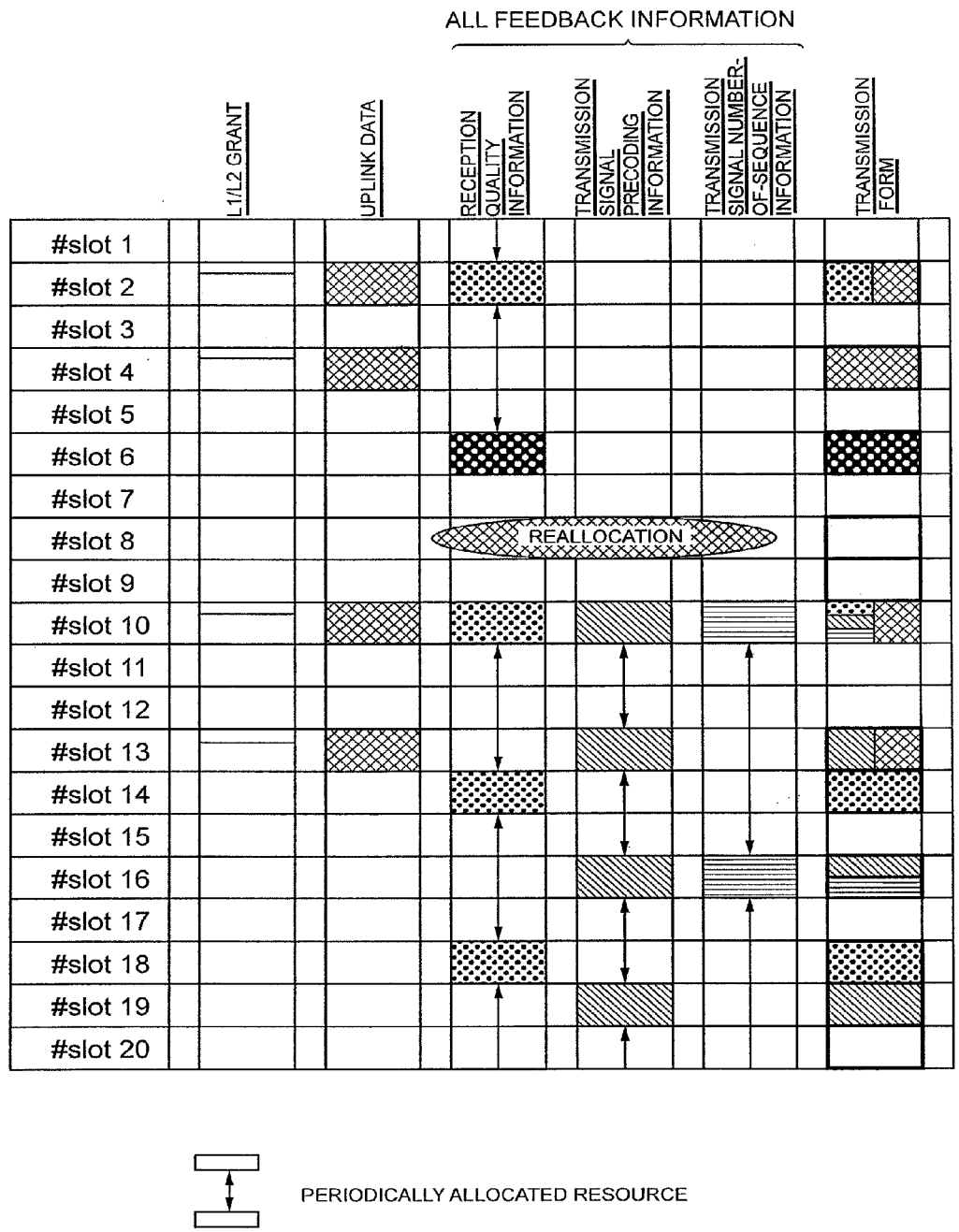

CASE WHERE A PLURALITY OF KINDS OF FEEDBACK INFORMATION IS ASSIGNED TO RESOURCES THAT ARE NOT CONTINUOUS IN THE SAME SLOT

BAND CONTINUOUS ON THE FREQUENCY AXIS IS NEWLY RESERVED AND ALLOCATED TO THE MOBILE STATION APPARATUS TO RESPOND TO SC-FDMA

WIRELESS COMMUNICATION SYSTEM, BASE STATION APPARATUS AND MOBILE STATION APPARATUS

This application is a continuation of U.S. patent application Ser. No. 12/673,036, filed on Feb. 11, 2010, which is a continuation of International Patent Application No. PCT/JP2008/067161, filed Sep. 24, 2008, which claims priority to Japanese Patent No. JP2007-249977, filed Sep. 26, 2007, all of which are hereby incorporated by reference in their entireties.

TECHNICAL FIELD

The present invention relates to a wireless communication system in which a mobile station apparatus measures reception quality of a signal received from a base station apparatus and transmits feedback information generated based on the reception quality to the base station apparatus, and the base station apparatus and mobile station apparatus applied to the wireless communication system.

BACKGROUND

3GPP (3rd Generation Partnership Project) is a project for discussing and preparing specifications of cellular telephone systems based on networks of evolved W-CDMA (Wideband-Code Division Multiple Access) and GSM (Global System for Mobile Communications). In 3GPP, the W-CDMA system has been standardized as the 3rd-generation cellular mobile communication system, and its service is started sequentially. Further, HSDPA (High-Speed Downlink Packet Access) with further increased communication rates has also been standardized, and its service is started. 3GPP is discussing evolution of the 3rd-generation radio access technique (Evolved Universal Terrestrial Radio Access: hereinafter, referred to as "E-UTRA").

As a downlink communication system in E-UTRA, proposed is an OFDMA (Orthogonal Frequency Division Multiple Access) system for multiplexing users using mutually orthogonal subcarriers. Further, in the OFDMA system are applied techniques such as an adaptive modulation/demodulation-error correcting scheme (AMCS) based on adaptive radio link control (Link Adaptation) such as channel coding, etc.

AMCS is a scheme for switching radio transmission parameters (hereinafter, referred to as "AMC mode") such as an error correcting scheme, coding rate of error correction, the level of data modulation, etc. corresponding to propagation path conditions of each mobile station apparatus so as to efficiently perform high-speed packet data transmission. For example, data modulation is switched to a multilevel modulation scheme with higher modulation efficiency such 16QAM (Quadrature Amplitude Modulation), 64QAM, etc. from QPSK (Quadrature Phase Shift Keying) as the propagation path conditions are better, and it is thereby possible to increase maximum throughput in the mobile communication system.

In OFDMA, it is possible to physically divide the communicable region in the frequency domain corresponding to subcarriers and time domain. A combination of some divided regions is referred to as a resource block, one or more resource blocks are allocated to each mobile station apparatus, and communications are performed while multiplexing a plurality of mobile station apparatuses. In order that the base station apparatus and each mobile station apparatus perform communications with optimal quality and rate in response to the request, required is resource block allocation and transmission scheme determination with consideration given to the reception quality in a frequency band corresponding to each subcarrier in the mobile station apparatus and the request of a communication rate in the mobile station apparatus.

The base station apparatus determines the transmission scheme and scheduling, and therefore, to achieve the request, needs to receive feedback of reception quality from each mobile station apparatus. Further, since conditions of the reception quality change every moment with a change in the propagation path, the mobile station apparatus is required to transmit the reception quality information as feedback to the base station apparatus regularly to perform stable communications.

For an uplink communication system in E-UTRA, it has been considered to adopt Single Carrier-Frequency Division Multiple Access (SC-FDMA). The OFDMA system that is multicarrier communication has advantages of being hard to undergo the effect of multipath and capable of using an optimal frequency band with flexibility corresponding to the propagation path, but has the problem that the Peak to Average Ratio is high in transmission signal, and it is difficult to introduce an amplifier with high output in mobile station apparatuses.

In contrast thereto, the SC-FDMA scheme enables a use frequency band to be selected with flexibility while adopting single carrier communication, and is suitable for uplink of E-UTRA. In this case, to achieve single carrier communication, signal transmission resources allocated to each mobile station apparatus are continuous on the frequency axis.

Further, to increase the communication path capacity in E-UTRA, the use of transmission diversity has been proposed such as SDM (Space Division Multiplexing) using MIMO (Multiple Input Multiple Output), SFBC (Space-Frequency Block Coding), or CDD (Cycle Delay Diversity). MIMO is a generic name for the Multiple input/Multiple output system or technique, and has a feature of using a plurality of antennas on the transmission and reception sides, and making the number of branches of input and output of radio signal multiple to transmit. By using MIMO, it is possible to form a plurality of propagation paths as a space by the effect of multipath, and multiplex a plurality of pieces of information to transmit. On the reception side, it is possible to combine power of a plurality of transmission antennas to obtain the reception gain.

In E-UTRA, it is assumed to use MIMO-SDM and transmission diversity on downlink, and the scheme to perform communication is determined in consideration of propagation path conditions between the base station apparatus and mobile station apparatus.

Further, in using MIMO-SDM on downlink, to facilitate separation of a plurality of sequences of information transmitted from antennas, it is considered to beforehand perform precoding on transmission signal sequences. The information of the transmission signal precoding is obtained from propagation path information estimated based on a signal received in the mobile station apparatus, and the base station apparatus cannot obtain the information completely. Therefore, the mobile station apparatus needs to transmit the transmission signal precoding information to the base station apparatus as feedback. Further, since a value of the precoding varies with a change in the propagation path, it is necessary to continuously send back the transmission signal precoding information at appropriate timing in communication of MIMO-SDM.

As described above, on E-UTRA downlink, it is possible to apply a plurality of sequences by applying MIMO to signals transmitted to the mobile station apparatus from the base station apparatus, and it is considered to support one to four sequences as the number of sequences. The number of sequences is determined based on the propagation path between the mobile station apparatus and the base station apparatus, and is calculated in the mobile station apparatus based on a reference signal transmitted from the base station apparatus. Herein, the mobile station apparatus only knows the number of sequences of frequency division transmission signals in Frequency Division Duplex (FDD) adopted in E-UTRA, and to apply MIMO-SDM to a downlink signal in the base station apparatus, the mobile station apparatus is required to transmit the information of the number of sequences to the base station apparatus as feedback. Since the optimal number of sequences between the base station apparatus and mobile station apparatus varies corresponding to conditions of the propagation path, the mobile station apparatus needs to transmit the information indicative of the number of sequences of transmission signals to the base station apparatus in response to a change in the propagation path.

As described above, to actualize SDM communication by MIMO, each mobile station apparatus is required to transmit three kinds of information i.e. the reception quality information, transmission signal precoding information and information of the number of sequences of transmission signals as feedback for the communication path with the base station apparatus. The number of bits, format and transmission frequency required to give each feedback are different from one another, and are varied corresponding to propagation path conditions and conditions of the mobile station apparatus. In other words, it is desired to switch the feedback schemes with flexibility.

As an example, time variations are more moderate in the optimal number of sequences of transmission signals than in the transmission signal precoding information. When scheduling is performed to always concurrently transmit the optimal number of sequences of transmission signals and the transmission signal precoding information, and feedback is performed in accordance with the transmission period of the transmission signal precoding information, the number of sequences of transmission signals that is not varied undergoes feedback many times, and as a result, overhead arises in uplink resources.

Meanwhile, when feedback is performed in accordance with the transmission period of the number of sequences of transmission signals, information of the transmission signal precoding information is insufficient in the base station apparatus. As a result, MIMO-SDM communication is performed by the precoding that is not suitable for the transmission signal, and system throughput decreases. In E-UTRA, it is a significant issue to increase the number of mobile station apparatuses that the base station apparatus can hold, and it is not desired to adopt means for suppressing uplink resources with a limited band or reducing throughput.

As another different example, when the moving speed of the mobile station apparatus changes, the propagation path also changes between the mobile station apparatus and base station apparatus. With the change, rates of changes are also varied in the reception quality information determined by the propagation path, transmission signal precoding information, and the optimal number of sequences of transmission signals. In other words, with the moving speed, periods to transmit these kinds of feedback information are varied, and therefore, it is desired to perform re-scheduling of the reception quality information, transmission signal precoding information, and the optimal number of sequences of transmission signals corresponding to circumstances.

As a method for the mobile station apparatus to transmit to a plurality of kinds of feedback information to the base station apparatus, various techniques have been reviewed with consideration given to each transmission timing. For example, techniques are proposed in "Design Aspects of MIMO-Related UE Feedback", 3GPP TSG RAN WG1 #49, R1-072213, March 2007 to transmit the sequence information of transmission signals alone to the mobile station apparatus as feedback, and then, concurrently transmit the reception quality information and transmission signal precoding information. In this method, since the sequence information of transmission signals is determined earlier, it is possible to reduce the transmission format of the reception quality information and transmission signal precoding information to be transmitted subsequently, and unnecessary bits cannot be transmitted. In other words, it is possible to reduce uplink overhead.

Further, it is proposed in "Feedback method for CQI, PMI and rank", 3GPP TSG RAN WG1 #49, R1-073512, August 2007 to concurrently perform coding on all the sequence information of transmission signals, transmission signal precoding information and reception quality information at a beforehand determined bandwidth to transmit. The processing is thereby simplified.

SUMMARY OF THE INVENTION

However, it is not considered in the methods as described the non-patent documents discussed above to transmit the reception quality information and transmission signal precoding information in different periods. The reception quality information and transmission signal precoding information is considered being the same combination always, and it is required to transmit signals in accordance with either information that is varied earlier. In other words, it is necessary to transmit also the information that is not required to transmit, and overhead corresponding to the transmission becomes the problem. As described above, the uplink band is limited, and when the band is occupied, the system capacity decreases.

Thus, there has been no example of consideration to transmit different kinds of feedback information in respective optimal periods, and an efficient transmission control method is required with consideration given to the information amount and transmission frequency of the reception quality information.

The present invention was made in view of such circumstances, and it is an object of the invention to provide a wireless communication system, base station apparatus and mobile station apparatus for setting transmission frequencies individually with flexibility corresponding to kinds of feedback information for the mobile station apparatus to transmit to the base station apparatus, thereby optimizing transmission periods corresponding to the kinds of feedback information, and minimizing a reduction in system throughput caused by disagreement of the transmission period with the optimal period.

To attain the above-mentioned object, the present invention took measures as described below. In other words, a wireless communication system of the invention is a wireless communication system in which a mobile station apparatus measures reception quality of a signal received from a base station apparatus, and transmits feedback information generated based on the reception quality to the base station apparatus, and is characterized in that the base station apparatus allocates resources of transmission timing corresponding to a kind of the feedback information, and that the mobile station apparatus transmits a plurality of kinds of feedback information to the base station apparatus using the allocated resources.

Thus, the base station apparatus allocates resources of transmission timing corresponding to the kind of feedback information, the mobile station apparatus transmits a plurality of kinds of feedback information to the base station apparatus using the allocated resources, and the base station apparatus is thereby capable of setting optimal transmission resources individually corresponding to the kind of feedback information. Further, the mobile station apparatus is capable of transmitting each kind of feedback information corresponding to allocation by the base station apparatus. As a result, the transmission period can be made optimal corresponding to the kind of feedback information, and it is possible to minimize reductions in system throughput caused by disagreement of the transmission period with the optimal period.

Further, in the wireless communication system of the invention, the base station apparatus is characterized by allocating resources periodically corresponding to the kind of feedback information.

Thus, the base station apparatus allocates resources periodically corresponding to the kind of feedback information, and therefore, when the mobile station apparatus transmits the feedback information to the base station apparatus, the base station apparatus can allocate resources of the transmission periodically. By this means, the need is eliminated that the base station apparatus performs resource allocation whenever each kind of feedback information is transmitted, and it is possible to reduce unnecessary signaling.

Further, in the wireless communication system of the invention, the base station apparatus is characterized by combining some of the feedback information, allocating the same resources to the combination, shifting transmission timing of each of the feedback information in the allocated resources, and thereby transmitting each of the feedback information.

Thus, the base station apparatus combines some of the feedback information, allocates the same resources to the combination, shifts transmission timing of each of the feedback information in the allocated resources, thereby transmits each of the feedback information, and therefore, does not need to always allocate resources individually to each feedback information, and it is possible to reduce redundant signaling caused by routine allocation.

Further, in the wireless communication system of the invention, the base station apparatus is characterized by gathering resources to newly allocate, while releasing already allocated resources when resources of a plurality of kinds of feedback information are present at the same transmission timing as a result of allocating resources of transmission timing corresponding to the kind of feedback information.

Thus, when resources of a plurality of kinds of feedback information are present at the same transmission timing as a result of allocating resources of transmission timing corresponding to the kind of feedback information, the base station apparatus gathers resources to newly allocate, while releasing the already allocated resources, and therefore, is able to transmit uplink signals conforming to SC-FDMA. Concurrently therewith, the base station apparatus is allowed to allocate resources to different mobile station apparatuses, and it is possible to eliminate waste in resource usage.

Further, in the wireless communication system of the invention, the base station apparatus is characterized by gathering resources into any resources while releasing already allocated resources except the gathered resources when resources of a plurality of kinds of feedback information are present at the same transmission timing as a result of allocating resources of transmission timing corresponding to the kind of feedback information.

Thus, when resources of a plurality of kinds of feedback information are present at the same transmission timing as a result of allocating resources of transmission timing corresponding to the kind of feedback information, the base station apparatus gathers resources into any resources while releasing already allocated resources except the gathered resources, and therefore, is able to gather the feedback information when resources of each kind of feedback information that are allocated by the base station apparatus individually are sufficiently large with respect to the feedback information, and it is possible to eliminate waste that would occur when resources are unnecessarily allocated.

Further, in the wireless communication system of the invention, the base station apparatus is characterized by allocating resources non-periodically corresponding to the kind of feedback information.

Thus, the base station apparatus allocates resources non-periodically corresponding to the kind of feedback information, and when at least one of feedback information transmitted from the mobile station apparatus is temporarily required, allocates periodical resources. The base station apparatus is thereby capable of performing efficient scheduling with overhead of signaling reduced. Meanwhile, when the base station apparatus temporarily enhances a transmission frequency with periodical resource allocation finished, the base station apparatus is allowed to allocate non-periodical resources to add to already allocated resources, and thus is able to perform efficient scheduling with overhead of signaling reduced.

Further, in the wireless communication system of the invention, it is a feature that the feedback information includes at least one of reception quality information generated based on the measured reception quality, transmission signal precoding information for the base station apparatus to perform precoding on a transmission signal, and transmission signal sequence information indicative of the number of transmission sequences communicable with the base station apparatus.

Thus, the feedback information includes at least one of the reception quality information, transmission signal precoding information, and transmission signal sequence information, and by considering the information, it is possible to respond to circumstances that the optical transmission period varies frequently as in MIMO-SDM, and further, to perform efficient resource allocation for the feedback information.

Further, in the wireless communication system of the invention, the mobile station apparatus is characterized by transmitting information to request allocation of resources used in transmitting a particular kind of feedback information among a plurality of kinds of feedback information to the base station apparatus.

Thus, the mobile station apparatus transmits information to request allocation of resources used in transmitting a particular kind of feedback information among a plurality of kinds of feedback information to the base station apparatus, and therefore, is able to request an optimal transmission period of feedback information to the base station apparatus based on observation information that only the mobile station apparatus can grasp. It is thereby possible to perform efficient communication actualizing improvements in system throughput.

Further, in the wireless communication system of the invention, the mobile station apparatus is characterized by including the information to request allocation of resources used in transmitting a particular kind of feedback information in the reception quality information to transmit to the base station apparatus.

Thus, the mobile station apparatus includes the information to request allocation of resources used in transmitting a particular kind of feedback information in the reception quality information to transmit to the base station, and therefore, the need is eliminated to allocate resources for the request separately. It is thereby possible to enhance usage efficient of resources on uplink.

Further, in the wireless communication system of the invention, the base station apparatus is characterized by transmitting to the mobile station apparatus a transmission permission signal for instructing the mobile station apparatus to transmit a particular kind of feedback information among a plurality of kinds of feedback information.

Thus, the base station apparatus transmits to the mobile station apparatus a transmission permission signal for instructing the mobile station apparatus to transmit a particular kind of feedback information among a plurality of kinds of feedback information, and a change in allocation of resources can be made with the minimum information required by the base station apparatus. It is thereby possible to actualize simplified resource allocation with unnecessary processing reduced.

Further, a base station apparatus of the invention is a base station apparatus applied to a wireless communication system in which a mobile station apparatus measures reception quality of a signal received from the base station apparatus, and transmits feedback information generated based on the reception quality to the base station apparatus, and is characterized by having a scheduler section that allocates resources of periodical transmission timing corresponding to the kind of feedback information, and a transmitting section that transmits the resource allocation information to the mobile station apparatus.

Thus, resources of transmission timing are allocated corresponding to the kind of feedback information, and the mobile station apparatus is thereby capable of transmitting the feedback information according to the allocation by the base station. As a result, the transmission period can be made optimal corresponding to the kind of feedback information, and it is possible to minimize reductions in system throughput caused by disagreement of the transmission period with the optimal period.

Further, in the base station apparatus of the invention, the scheduler is characterized by combining some of the feedback information, allocating the same resources to the combination, shifting transmission timing of each of the feedback information in the allocated resources, and thereby transmitting each of the feedback information.

Thus, the base station apparatus combines some of the feedback information, allocates the same resources to the combination, shifts transmission timing of each of the feedback information in the allocated resources, thereby transmits each of the feedback information, and therefore, does not need to always allocate resources individually to each feedback information, and it is possible to reduce redundant signaling caused by routine allocation.

Further, in the base station apparatus of the invention, it is a feature that the feedback information includes at least one of reception quality information generated based on the reception quality measured by the mobile station apparatus, transmission signal precoding information to perform precoding on a transmission signal, and transmission signal sequence information indicative of the number of communicable transmission sequences.

Thus, the feedback information includes at least one of the reception quality information, transmission signal precoding information, and transmission signal sequence information, and by considering the information, it is possible to respond to circumstances that the optical transmission period varies frequently as in MIMO-SDM, and further, to perform efficient resource allocation for the feedback information.

Further, a mobile station apparatus of the invention is a mobile station apparatus applied to a wireless communication system in which the mobile station apparatus measures reception quality of a signal received from a base station apparatus, and transmits feedback information generated based on the reception quality to the base station apparatus, and is characterized by having a receiving section that receives resource allocation information for transmission timing corresponding to a kind of the feedback information from the base station apparatus, a reception quality information generating section that generates reception quality information based on the measured reception quality, a transmission signal precoding information generating section that generates transmission signal precoding information for the base station apparatus to perform precoding on a transmission signal based on a signal received from the base station apparatus, a transmission signal number-of-sequence information generating section that calculates transmission signal sequence information indicative of the number of transmission sequences communicable with the base station apparatus based on a signal received from the base station apparatus, and a transmitting section that transmits at least one of the reception quality information, the transmission signal precoding information and the transmission signal sequence information to the base station apparatus as the feedback information based on the received resource allocation information.

According to this constitution, it is possible to transmit each kind of feedback information corresponding to allocation of resources of transmission timing corresponding to the kind of feedback information by the base station apparatus. As a result, the transmission period can be made optimal corresponding to the kind of feedback information, and it is possible to minimize reductions in system throughput caused by disagreement of the transmission period with the optimal period. Further, as the feedback information, the mobile station apparatus transmits at least one of the reception quality information, transmission signal precoding information, and transmission signal sequence information to the base station apparatus, and it is thereby possible to respond to circumstances that the optical transmission period varies frequently as in MIMO-SDM, and further, to perform more efficient resource allocation for the feedback information.

According to the invention, the base station apparatus allocates resources of transmission timing corresponding to the kind of the feedback information, the mobile station apparatus transmits a plurality of kinds of feedback information to the base station apparatus using the allocated resources, and the base station apparatus is thereby capable of setting optimal transmission resources individually corresponding to the kind of feedback information. Further, the mobile station apparatus is capable of transmitting each kind of feedback information corresponding to allocation by the base station apparatus. As a result, the transmission period can be made optimal corresponding to the kind of feedback information, and it is possible to minimize reductions in system throughput caused by disagreement of the transmission period with the optimal period.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A is a schematic block diagram showing a configuration example of a base station apparatus in a mobile communication system according to Embodiment 1 of the invention;

FIG. 2B is another diagram showing the operation example of the mobile communication system according to Embodiment 1;

FIG. 4A is a diagram showing an operation example of a mobile communication system according to Embodiment 3;

Figure 1B:
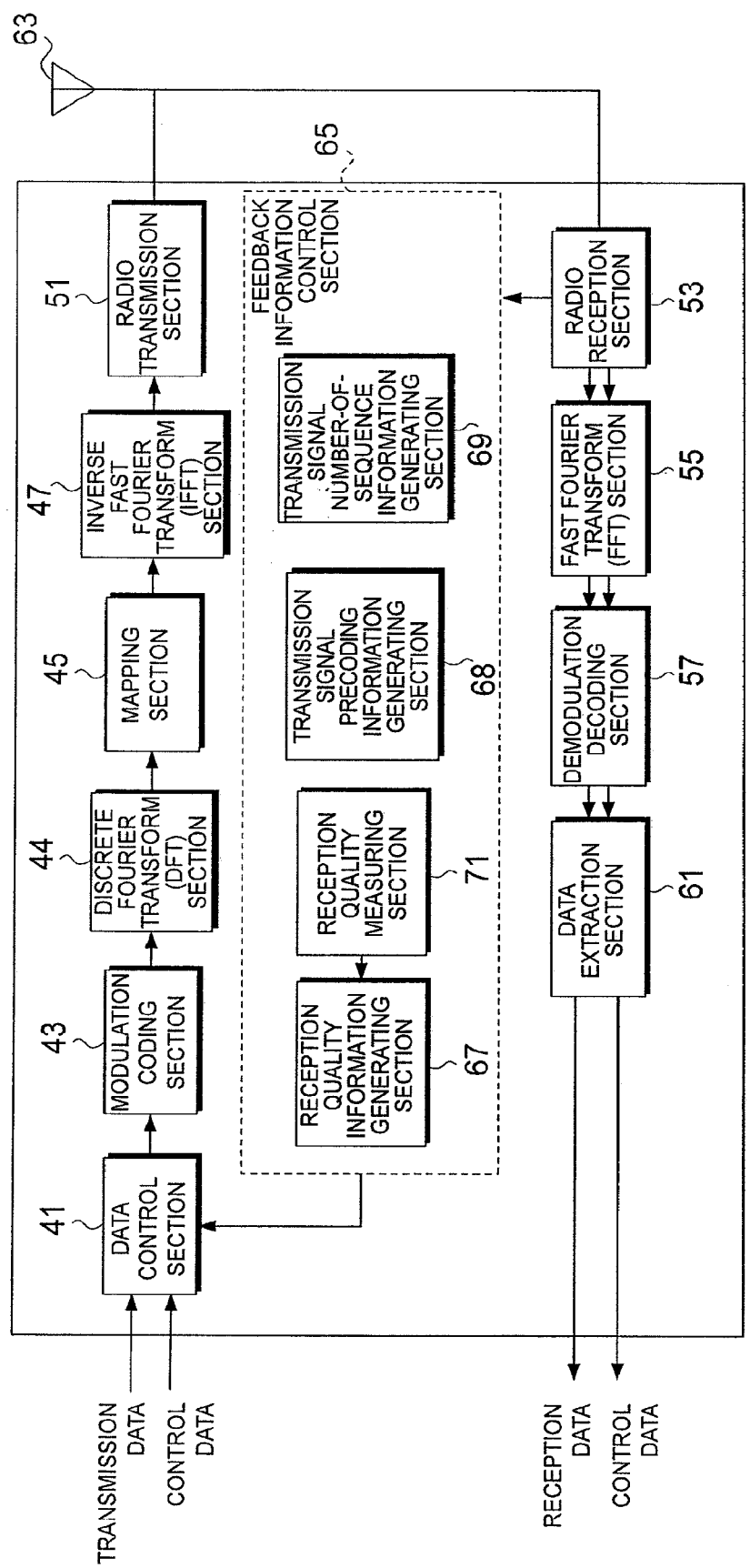
FIG. 1B is a schematic block diagram showing a configuration example of a mobile station apparatus in the mobile communication system according to Embodiment 1 of the invention.

The following symbols are used in conjunction with the drawings

1 Data control section
3 Modulation coding section
4 Transmission signal precoding section
5 Mapping section
7 Inverse Fast Fourier Transform (IFFT) section
11 Radio transmission section
12 Antenna
15 Radio reception section
17 Fast Fourier Transform (FFT) section
21 Inverse Discrete Fourier Transform (IDFT) section
22 Demodulation decoding section
23 Data extraction section
25 Scheduler section
27 Transmission information control section
31 Modulation code control section
33 Frequency selective scheduler section
35 Transmission signal number-of-sequence information control section
36 Transmission signal precoding information control section
41 Data control section
43 Modulation coding section
44 Discrete Fourier Transform (DFT) section
45 Mapping section
47 Inverse Fast Fourier Transform (IFFT) section
51 Radio transmission section
53 Radio reception section
55 Fast Fourier Transform (FFT) section
57 Demodulation decoding section
61 Data extraction section
63 Antenna
65 Feedback information control section
67 Reception quality information generating section
68 Transmission signal precoding information generating section
69 Transmission signal number-of-sequence information generating section
71 Reception quality measuring section

DETAILED DESCRIPTION OF ILLUSTRATIVE EMBODIMENTS

Embodiments of the invention will specifically be described below with reference to drawings.

Described first is a mobile communication system according to a first embodiment (Embodiment 1) of the invention. The mobile communication system is comprised of base station apparatuses and mobile station apparatuses. FIGS. 1A and 1B are block diagrams showing configuration examples of the base station apparatus and the mobile station apparatus according to this Embodiment, respectively. As shown in FIG. 1A, the base station apparatus 1A is provided with a data control section 1, modulation coding section 3, transmission signal precoding section 4, mapping section 5, Inverse Fast Fourier Transform (IFFT) section 7, radio transmission section 11, radio reception section 15, Fast Fourier Transform (FFT) section 17, Inverse Discrete Fourier Transform (IDFT) section 21, demodulation decoding section 22, data extraction section 23, transmission information control section 27, and antenna 12.

The transmission information control section 27 includes a scheduler section 25, modulation code control section 31, frequency selective scheduler section 33, transmission signal number-of-sequence information control section 35, and transmission signal precoding information control section 36. The antenna 12 has the number of antennas required for MIMO-SDM communication.

The data control section 1 receives transmission data and control data to transmit to each mobile station apparatus B, and each data is sequentially transmitted to the mobile station apparatus B according to directions from the transmission information control section 27. When MIMO-SDM is applied to output data, the data is divided into a plurality of transmission sequences according to information of the transmission signal number-of-sequence information control section 35.

The modulation coding section 3 performs modulation processing and error correcting coding processing on a signal input from the data control section 1, based on a modulation scheme and coding rate by the transmission information control section 27, and outputs the resultant signal to the transmission signal precoding section 4. The transmission signal precoding section 4 processes the signal input from the modulation coding section 3 based on control information input from the transmission information control section 27, and outputs the resultant signal to the mapping section 5.

The mapping section 5 performs mapping of data output from the modulation coding section 3 on each subcarrier based on frequency selective scheduling information input from the transmission information control section 27, and outputs the resultant signal to the Inverse Fast Fourier Transform section 7. The Inverse Fast Fourier Transform section 7 performs processing of Inverse Fast Fourier Transform on the data output from the mapping section 5 to transform into a time-series baseband digital signal, and outputs the resultant signal to the radio transmission section 11.

The signal output from the Inverse Fast Fourier Transform section 7 undergoes digital/analog conversion in the radio transmission section 11, is up-converted into a signal with a frequency suitable for transmission, and transmitted to each mobile station apparatus B via the antenna 12.

The scheduler section 25 performs downlink scheduling and uplink scheduling based on control information such as a resource area usable for each mobile station apparatus, intermittent transmission/reception cycle, format of a transmission data channel, buffer status the like. The modulation code control section 31 determines a modulation scheme and coding rate applied to each data based on reception quality information transmitted from the mobile station apparatus B.

The frequency selective scheduler section 33 performs processing of frequency selective scheduling applied to each data, based on the reception quality information transmitted from the mobile station apparatus B. The transmission signal number-of-sequence information control section 35 determines the number of sequences of transmission signals, based on the transmission signal number-of-sequence information transmitted from the mobile station apparatus B, traffic status of the base station apparatus and the like. The transmission signal precoding information control section 36 determines precoding to apply to the transmission data based on the transmission signal precoding information transmitted from the mobile station apparatus B.

The transmission information control section 27 controls operations of the scheduler section 25, modulation code control section 31, frequency selective scheduler section 33, transmission signal number-of-sequence information control section 35, transmission signal precoding information control section 36, and transmission information control section 27, using control information input from the higher layer and control information input from the data extraction section 23. The section 27 manages the output information of each section to output control information required for operations of the data control section 1, modulation coding section 3, transmission signal precoding section 4 and mapping section 5.

The radio reception section 15 performs analog/digital conversion on a signal received in the antenna 12 to downcovert into a baseband signal, and outputs the resultant signal to the Fast Fourier Transform (FFT) section 17. The Fast Fourier Transform (FFT) section 17 performs Fourier transform on the reception signal on a unit processing time basis to output to the Inverse Discrete Fourier Transform section 21. The Inverse Discrete Fourier Transform section 21 divides the input signal into bands assigned to respective mobile station apparatuses to perform Inverse Fourier transform processing, and outputs a reproduced SC-FDMA signal to the demodulation decoding section 22.

The demodulation decoding section 22 performs demodulation and decoding on the input signal for each mobile station apparatus to output to the data extraction section 23. The data extraction section 23 divides the signal input from the demodulation decoding section 22 into information required for control information generation in the transmission information control section 27, reception data, and control data required for the higher layer to output.

Meanwhile, as shown in FIG. 1B, the mobile station apparatus B is provided with a data control section 41, modulation coding section 43, Discrete Fourier Transform (DFT) section 44, mapping section 45, Inverse Fast Fourier Transform (IFFT) section 47, radio transmission section 51, radio reception section 53, Fast Fourier Transform (FFT) section 55, demodulation decoding section 57, data extraction section 61, feedback information control section 65 and antenna 63. The feedback information control section 65 has a reception quality information generating section 67, reception quality measuring section 71, transmission signal precoding information generating section 68, and transmission signal number-of-sequence information generating section 69. The antenna 63 is provided with the number of antennas required for MIMO-SDM communication.

The data control section 41 receives transmission data, control data and feedback information output from the feedback information control section 65 each to transmit to the base station apparatus A, and each data is sequentially transmitted to the base station apparatus A.

The modulation coding section 43 performs modulation processing and error correcting coding processing on the signal input from the data control section 41, and outputs each data to the Discrete Fourier Transform section 44. The Discrete Fourier Transform section 44 performs Fourier transform processing on the signal input from the modulation coding section 43, and generates a signal to perform SC-FDMA to output to the mapping section 45. The mapping section 45 performs mapping of the data input from the Discrete Fourier Transform section 44 on subcarriers assigned by the base station apparatus A to output to the Inverse Fast Fourier Transform section 47.

The Inverse Fast Fourier Transform section 47 performs processing of Inverse Fast Fourier Transform on a symbol sequence input from the mapping section 45 to transform into a time-series baseband digital signal, and outputs the resultant signal to the radio transmission section 51. The signal output from the Inverse Fast Fourier Transform section 47 undergoes digital/analog conversion in the radio transmission section 51, is up-converted into a signal with a frequency suitable for transmission, and transmitted to the base station apparatus A via the antenna.

The reception quality measuring section 71 measures reception quality of a signal received from the base station apparatus A. Based on the information measured by the reception quality measuring section 71, the reception quality information generating section 67 generates reception quality information to transmit to the base station apparatus A. The transmission signal precoding information generating section 68 calculates propagation path information using a signal received from the base station apparatus A, and generates information of precoding on a transmission signal to be performed by the base station apparatus A. The transmission signal number-of-sequence information generating section 68 calculates propagation path information using a signal received from the base station apparatus A, and calculates the number of transmission sequences communicable with the base station apparatus A.

The feedback information control section 65 manages control signals generated in the reception quality information generating section 67, transmission signal precoding information generating section 68, and transmission signal number-of-sequence information generating section 69 to output to the data control section 41. The feedback information managed in the feedback information control section 65 is not limited to generation and control of the signals described herein, and may include other kinds of feedback information.

Figure 2A:
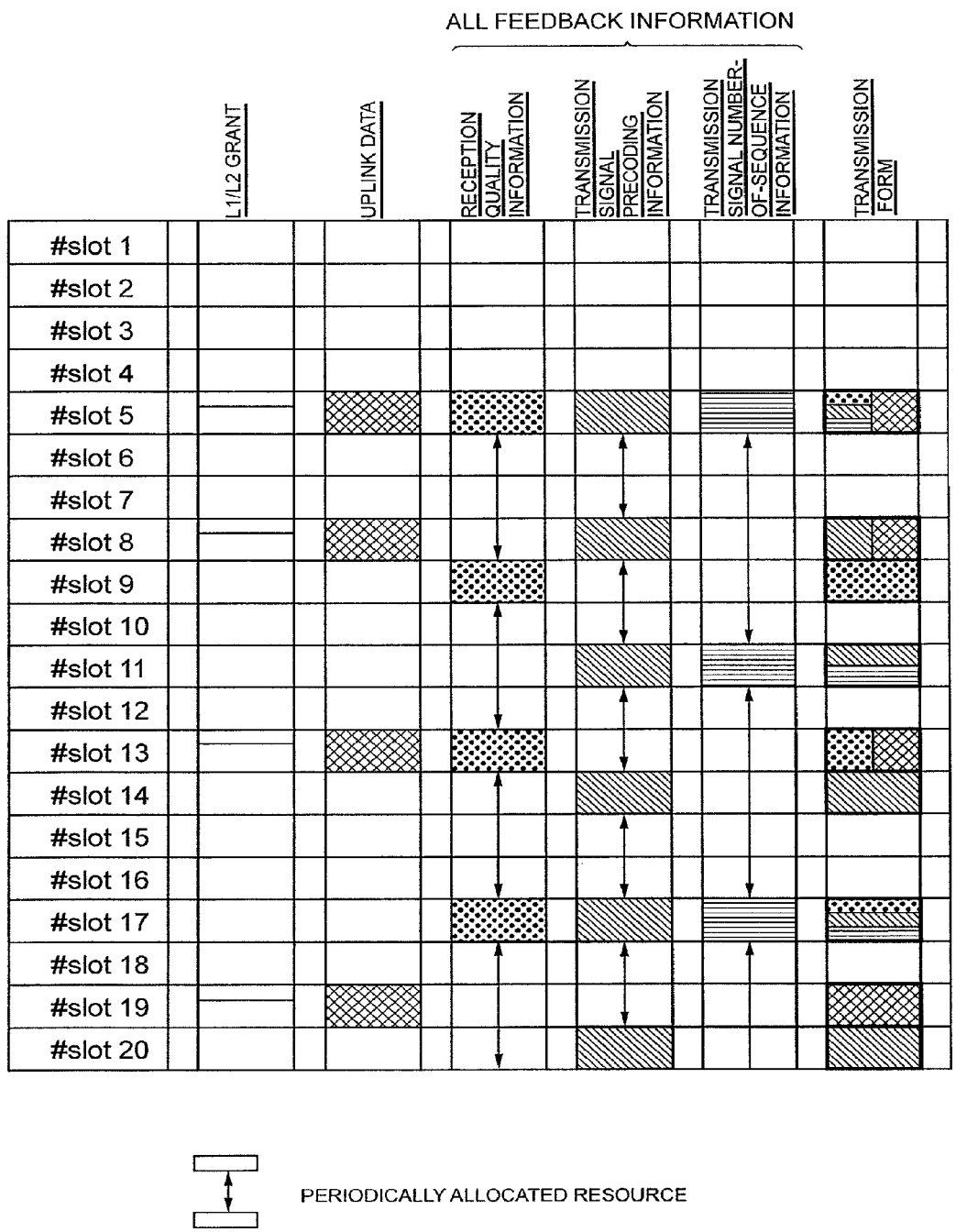
FIG. 2A is a diagram showing an operation example of the mobile communication system according to Embodiment 1.

FIGS. 2A and 2B are diagrams showing an operation example of the mobile communication system according to Embodiment 1. FIG. 2A shows control signals transmitted to the mobile station apparatus B from the base station apparatus A, uplink data and feedback information transmitted to the base station apparatus A from the mobile station apparatus B, and their transmission forms. Further, FIG. 2B shows a sequence chart of operations of the base station apparatus A and mobile station apparatus B. FIGS. 2A and 2B show the operations of from #slot1 to #slot20 as an example, and correspond to the slot-axis (vertical axis) direction. In FIG. 2B, exchanges of codes 101 to 114 are performed between the base station apparatus A and mobile station apparatus B.

As well as the reception quality information, the mobile station apparatus B transmits uplink data to the base station apparatus A using PUSCH (Physical Uplink Shared Channel), corresponding to resource allocation instructed on a downlink control channel (PDCCH: Physical Downlink Control Channel). The downlink control channel (PDCCH) is a signal (L1/L2 grant) to grant data transmission on uplink. Thereafter, in this Embodiment, the L1/L2 grant indicates L1/L2 grant to grant an uplink transmission signal to which long-term resources has not been allocated.

First, in #slot2, the base station apparatus A includes parameters used in transmitting the reception quality information, and information about long-term resource allocation to transmit the feedback information (reception quality information, transmission signal precoding information and transmission signal number-of-sequence information) in RRC signaling to transmit to the mobile station apparatus B (101).

Herein, the parameters used in transmitting the feedback information indicate information of an uplink channel to use such as the uplink control channel (PUCCH), uplink data channel (PUSCH), etc. to use, measurement interval to measure the reception quality information, information of frequency resolution (frequency interval) for the mobile station apparatus B to measure and the like. Further, the parameters also indicate a rate (the number of symbols in SC-FDMA) of the feedback information to be transmitted with resources on the assigned channel (PUSCH or PUCCH).

Further, the above-mentioned long-term resource allocation indicates information of time resources (transmission slots) to transmit the reception quality information, and frequency resources and code resources to transmit each of the feedback information.

Described herein are resource allocation and transmission form in concurrently transmitting a plurality of kinds of feedback information. When the base station apparatus A performs long-term resource allocation on a plurality of feedback information for the mobile station apparatus B to transmit, a case occurs that a plurality of feedback information is concurrently transmitted in the same slot. In this case, since SC-FDMA is applied to uplink signals, allocated resources need to be continuous in the frequency-axis direction.

Figure 7A:
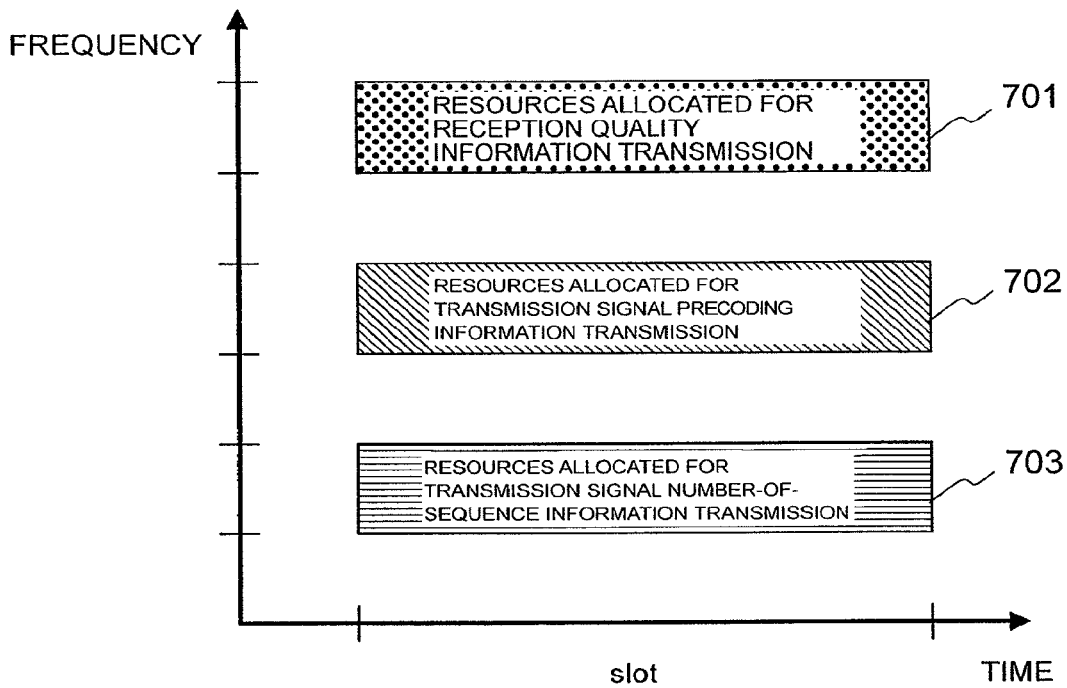
FIG. 7A is a diagram to explain a mechanism of resource allocation in the invention.
Figure 7B:
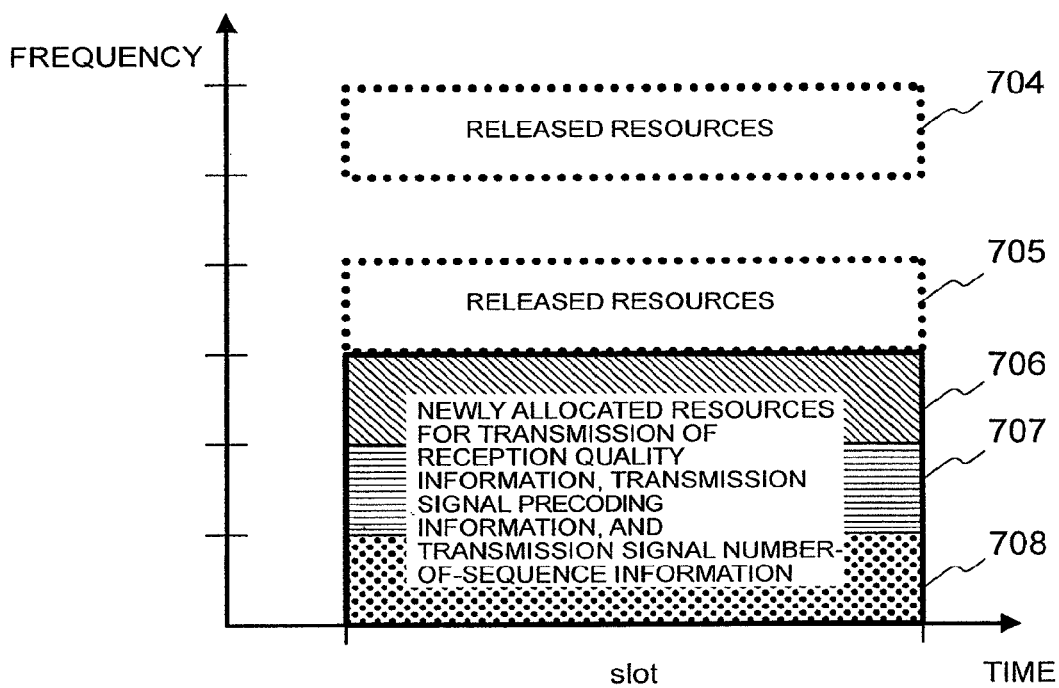
FIG. 7B is another diagram to explain the mechanism of resource allocation in the invention.

For example, as shown in FIG. 7A, when resources to transmit the reception quality information, transmission signal precoding information, and transmission signal number-of-sequence information are allocated to resources 701, 702 and 703 that are not continuous in the frequency-axis direction, the base station apparatus A needs to once release resources in this slot and reallocate the resources to continuous regions on the frequency axis indicated by "706", "707" and "708" shown in FIG. 7B. The released resources 704 and 705 can be allocated to another mobile station apparatus. Herein, it is not necessary to have the same resource as "703" in FIG. 7A and "707" in FIG. 7B, and resources on which the base station apparatus can perform scheduling are all usable.

Further, for feedback information to be multiplexed in a single resource, the information can be expressed in any form as long as its physical format is beforehand specified. With respect to the above-mentioned processing, the base station apparatus A is able to perform this processing in resource allocation, thereby completes reallocation of resources in the stage of #slot2, and includes this information in RRC signaling shown by "101" to transmit.

Figure 8A:
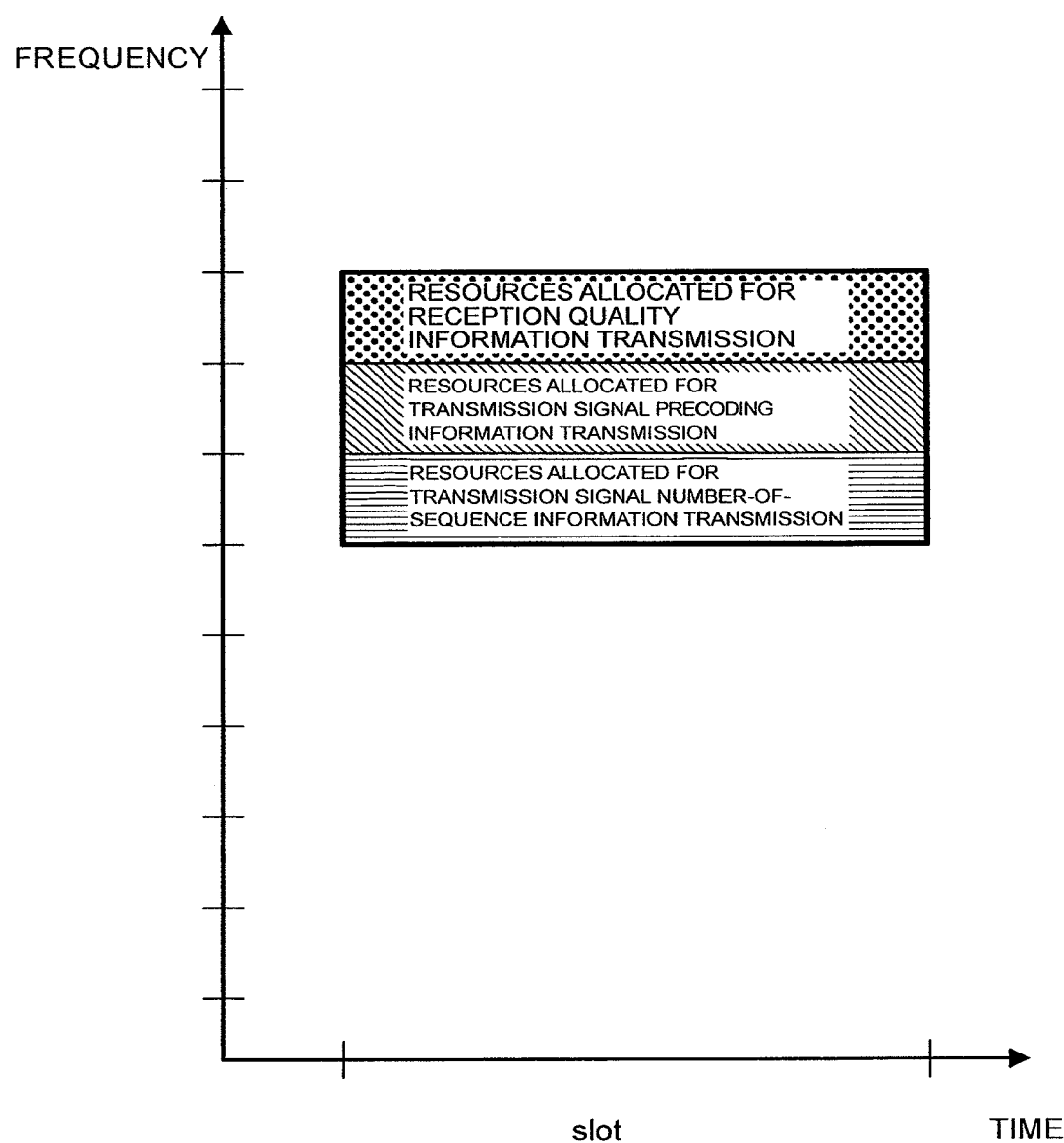
FIG. 8A is a diagram to explain a mechanism of resource allocation when uplink data exists in the invention.
Figure 8B:
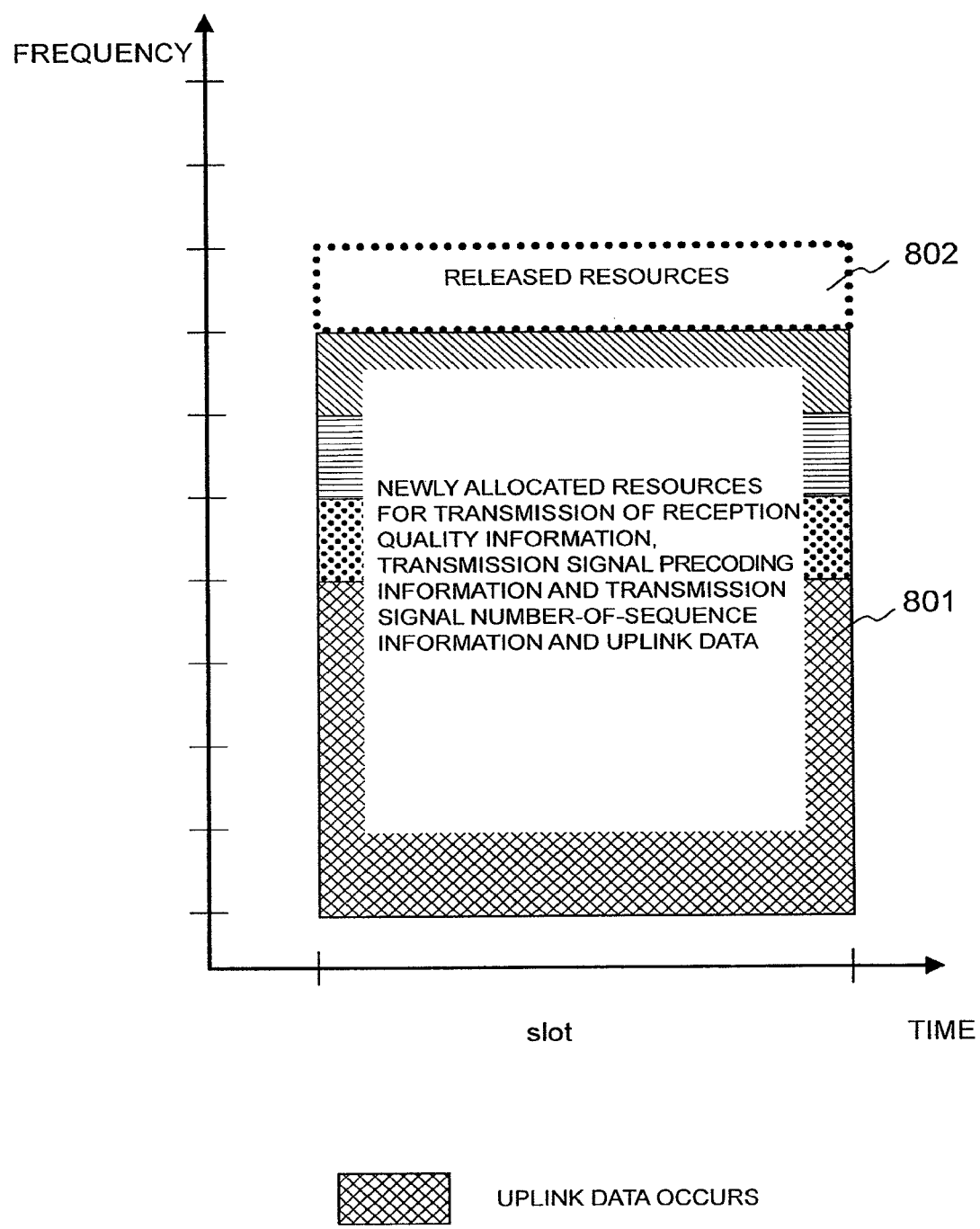
FIG. 8B is another diagram to explain the mechanism of resource allocation when uplink data exists in the invention.

Described next are resource allocation and transmission form in concurrently transmitting uplink data and feedback information with reference to FIG. 8. As shown in FIG. 8A, although transmission resources of the feedback information are beforehand reserved according to the above-mentioned procedure, there is a possibility that uplink data occurs after allocating feedback information transmission resources. In this case, when transmission grant of the uplink data is given, in addition to the uplink data (801), resources including transmission resources of the feedback information are allocated as shown in FIG. 8B, and the uplink data and feedback information is transmitted using the resources.

At this point, although the resources are allocated by RRC signaling of #slot2, the resources (802) of the feedback information released by this processing are assumed to be released without the base station apparatus A and mobile station apparatus B particularly performing signaling, and the base station apparatus A is able to allocate the released resources to another mobile station apparatus. As described above, as long as physical formats of the uplink data and reception quality information are defined conforming o SC-FDMA, any expression is allowed.

Described next is the operation in each slot after completing allocation of feedback information transmission resources by RRC signaling in FIGS. 2A and 2B. Herein, from #slot5, resources to transmit on the uplink data channel are allocated every four slots for the reception quality information, every three slots for the transmission signal precoding information, and every six slots for the transmission signal number-of-sequence information.

In #slot5, the uplink data occurs, and grant of data transmission is given in L1/L2 grant from the base station apparatus A (102). Herein, the mobile station apparatus B includes the reception quality information, transmission signal precoding information, transmission signal number-of-sequence information (these three kinds of information is referred to as "all feedback information") and uplink data to transmit on the data channel assigned by L1/L2 grant (103).

As in #slot8 and #slot13, uplink data similarly occurs, and data transmission grant is given by L1/L2 grant (104, 108, respectively). Also herein, using resources for transmission of the uplink data and each of the feedback information allocated again by L1/L2 grant, the mobile station apparatus B transmits the transmission signal precoding information (#slot8) and reception quality information (#slot13) (105, 109, respectively) together with the uplink data. At this point, resources for transmission of the transmission signal precoding information (#slot8) and reception quality information (#slot13) allocated in #slot2 are released.

In #slot9, the mobile station apparatus B transmits only the reception quality information to the base station apparatus A (106). As resources used in the transmission, the mobile station apparatus B uses the resources allocated to transmit the reception quality information allocated in #slot2. This processing is the same as in #slot14 and #slot20, and the information is transmitted using the resources allocated in #slot2 (110, 114).

In #slot11, uplink data does not occur, and the mobile station apparatus B transmits the transmission signal precoding information and transmission signal number-of-sequence information to the base station apparatus A. At this point, resources to concurrently transmit the transmission signal precoding information and transmission signal number-of-sequence information are allocated in the processing of #slot2, and using the resources, the transmission signal precoding information and transmission signal number-of-sequence information is concurrently transmitted (107). This processing is the same as in #slot17, the reception quality information, transmission signal precoding information and transmission signal number-of-sequence information is concurrently transmitted by the resources allocated in #slot2 (111).

In #slot19, uplink data occurs, and in this slot, the feedback information is not transmitted. In this case, using resources allocated by L1/L2 grant (112), the uplink data is transmitted (113).

Further, as the feedback information, this Embodiment adopts three kinds of information, i.e., the reception quality information, transmission signal precoding information and transmission signal number-of-sequence information, but the invention is applicable to any other feedback signals that the mobile station apparatus transmits to the base station apparatus, irrespective of the kinds.

As described above, according to Embodiment 1 of the invention, the base station apparatus A includes the transmission parameter information of each of the feedback information and long-term resource allocation in RRC signaling to transmit to the mobile station apparatus B for transmission of the feedback information such as the reception quality information and the like, and thus, controls resource allocation to transmit each of the feedback information. By this means, the mobile station apparatus B is able to transmit each of the feedback information to the base station apparatus A with an optimal period, and since vacant resources do not arise, it is possible to actualize efficient transmission control.

Figure 3A:
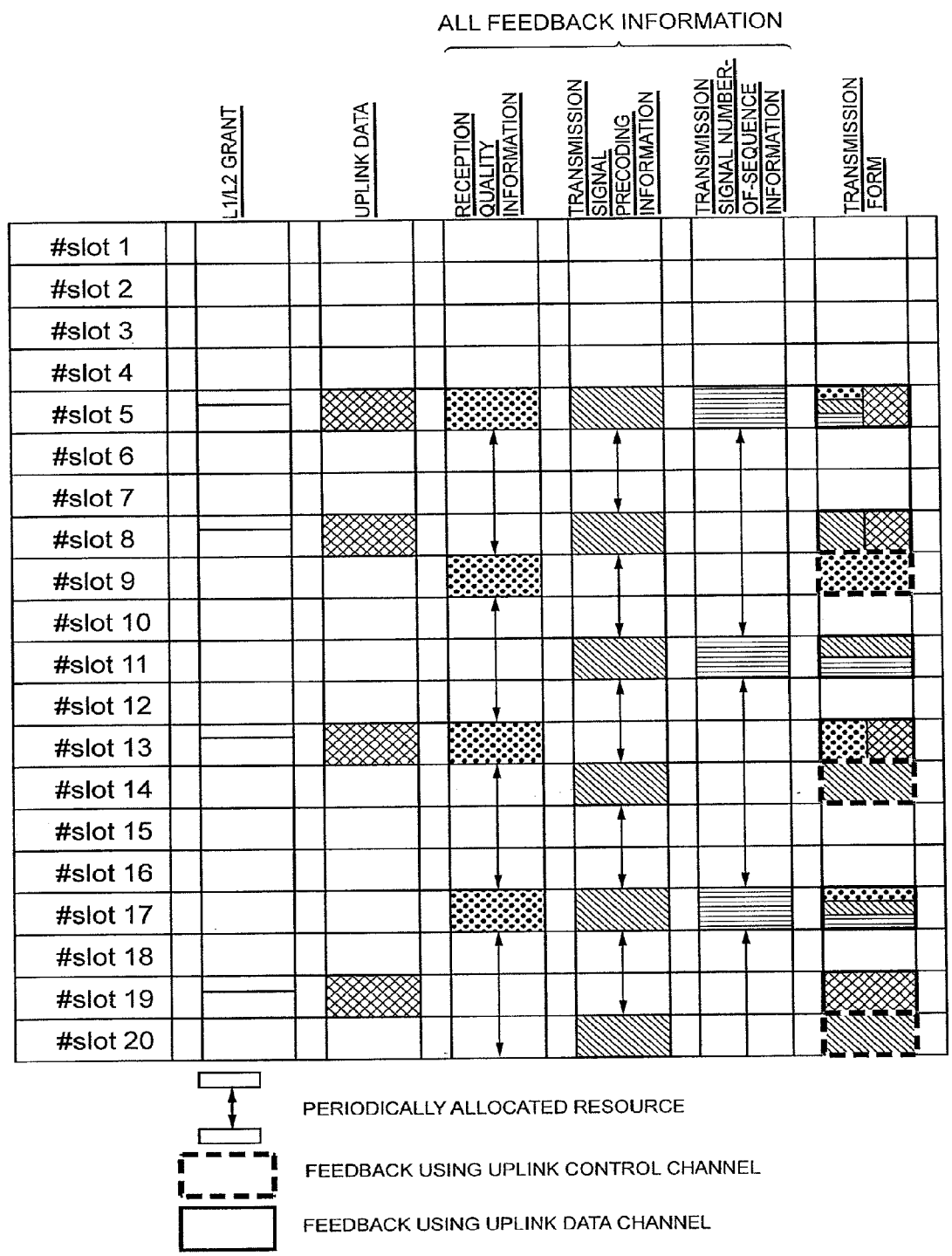
FIG. 3A is a diagram showing an operation example of a mobile communication system according to Embodiment 2.
Figure 3B:
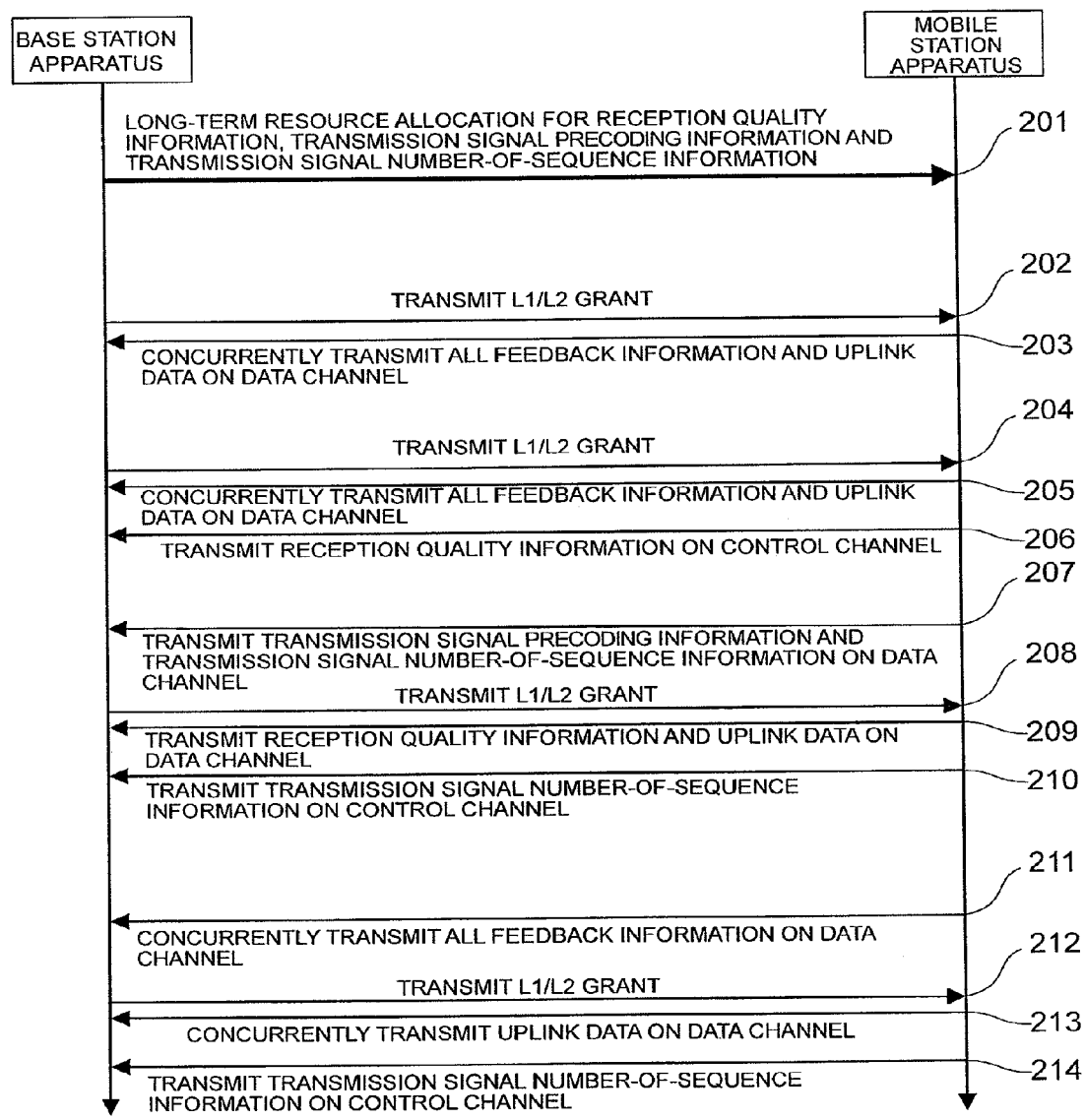
FIG. 3B is another diagram showing the operation example of the mobile communication system according to Embodiment 2.

A mobile communication system according to Embodiment 2 of the invention will be described below with reference to drawings. FIGS. 3A and 3B are diagrams showing an operation example of the mobile communication system according to Embodiment 2. FIG. 3A shows control signals transmitted to the mobile station apparatus B from the base station apparatus A, uplink data and feedback information transmitted to the base station apparatus A from the mobile station apparatus B, and their transmission forms. Further, FIG. 3B shows a sequence chart of operations of the base station apparatus and mobile station apparatus. FIGS. 3A and 3B show the operations of from #slot1 to #slot20 as an example.

A difference between this Embodiment and Embodiment 1 is that the base station apparatus A assigns the uplink control channel (PUCCH), instead of the uplink data channel (PUSCH), for resources for the mobile station apparatus B to transmit the feedback information in #slot9, #slot14 and #slot20. The operations (201 to 214) performed in the other slots are the same as in Embodiment 1.

Described below is the operation in each slot in a second embodiment (Embodiment 2) of the invention. First, in #slot2, the base station apparatus A includes parameters used in transmitting the reception quality information, and information about long-term resource allocation to transmit the feedback information (reception quality information, transmission signal precoding information and transmission signal number-of-sequence information) in RRC signaling to transmit to the mobile station apparatus B (201). Herein, as #slot9, #slot14 and #slot20, in slots to transmit only a single kind of feedback information, since the information amount (the number of bits) to transmit is small, the base station apparatus A assigns the uplink control channel (PUCCH) with a limited band but with high flexibility. In contrast thereto, in #slot5, #slot11 and #slot17 to transmit a plurality of kinds of feedback information, the base station apparatus A assigns the uplink data channel (PUSCH) suitable for transmission of a large amount of information.

In #slot9, the mobile station apparatus B transmits only the reception quality information to the base station apparatus A (206). As resources used in the transmission, the mobile station apparatus B uses resources on the uplink control channel allocated to transmit the reception quality information allocated in #slot2. This processing is the same as in #slot14 and #slot20, and the information is transmitted using the resources on the uplink control channel allocated in #slot2 (210, 214). The operations in slots except the above-mentioned slots are the same as in Embodiment 1.

As described above, according to Embodiment 2 of the invention, the base station apparatus A includes the transmission parameter information of each of the feedback information and long-term resource allocation in RRC signaling to transmit to the mobile station apparatus B for transmission of the feedback information such as the reception quality information and the like, and thus, controls resource allocation to transmit each of the feedback information. Then, for the allocated resources, without being limited to the uplink data channel (PUSCH), it is possible to use the uplink control channel (PUCCH). By this means, the mobile station apparatus B is able to transmit each of the feedback information to the base station apparatus A on an optimal channel with an optimal period, schedule allocation is made ease in the base station apparatus A, and it is possible to actualize more efficient transmission control.

Figure 4B:
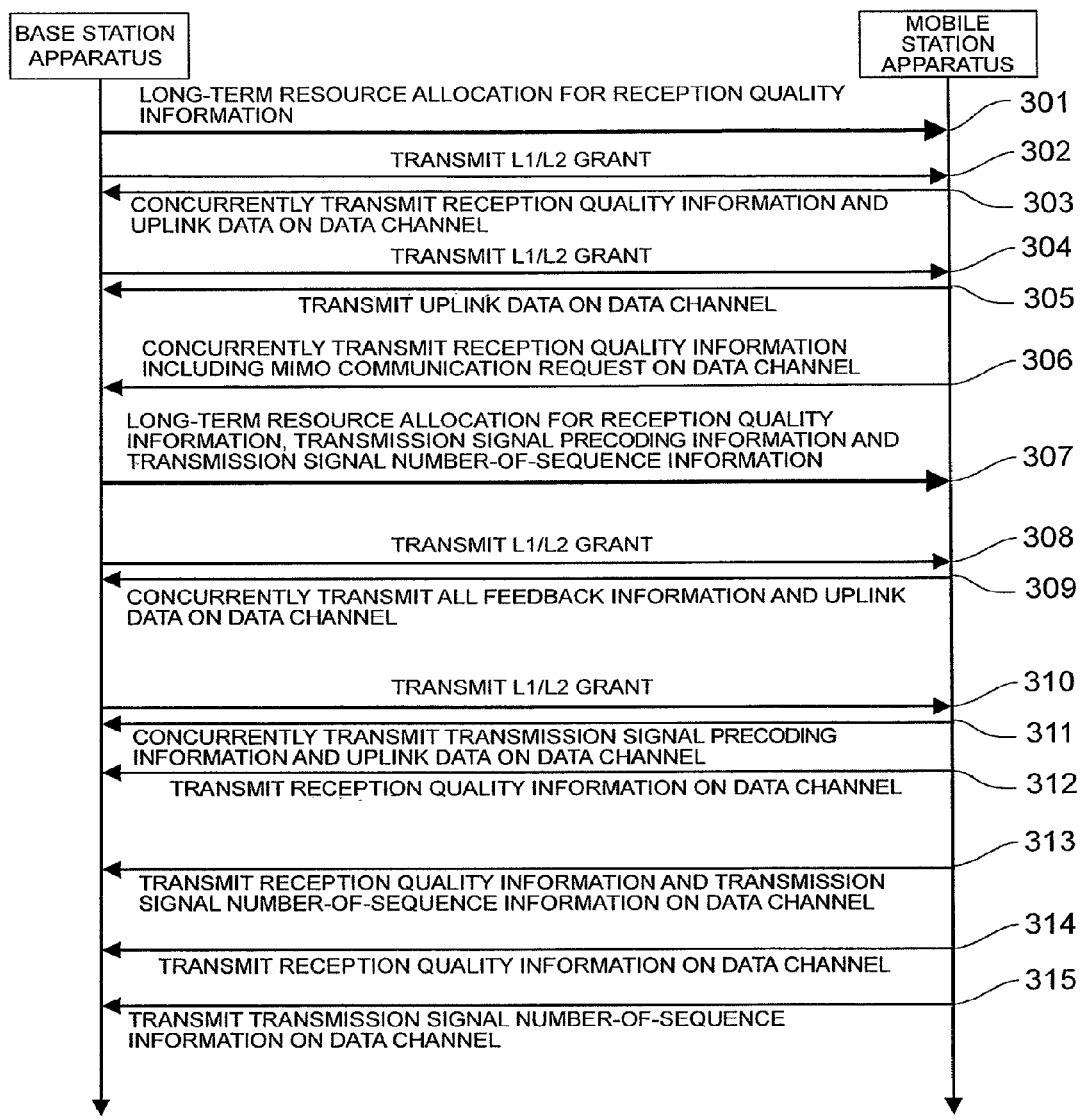
FIG. 4B is another diagram showing the operation example of the mobile communication system according to Embodiment 3.

A mobile communication system according to a third embodiment (Embodiment 3) of the invention will be described below with reference to drawings. FIGS. 4A and 4B are diagrams showing an operation example of the mobile communication system according to Embodiment 3. FIG. 4A shows control signals transmitted to the mobile station apparatus B from the base station apparatus A, uplink data and feedback information transmitted to the base station apparatus A from the mobile station apparatus B, and their transmission forms. Further, FIG. 4B shows a sequence chart of operations of the base station apparatus and mobile station apparatus. FIGS. 4A and 4B show the operations of from #slot1 to #slot20 as an example.

In this Embodiment, such a case is assumed that the communication path changes due to a reason of moving of the mobile station apparatus B or the like during communications between the base station apparatus A and mobile station apparatus B and that MIMO-SDM communication is thereby allowed. A significant difference from the processing flow as shown in FIGS. 2A and 2B is that the mobile station apparatus B transmits a request to perform MIMO-SDM communication in #slot6 after only resources to transmit the reception quality information are allocated in #slot1, and that resources to transmit the transmission signal precoding information and transmission signal number-of-sequence information are allocated in #slot8.

The operation in each slot in Embodiment 3 of the invention will be described with reference to FIGS. 4A and 4B. First, in #slot1, the base station apparatus A includes parameters used in transmitting the reception quality information, and information about long-term resource allocation to transmit the feedback information (reception quality information) in RRC signaling to transmit to the mobile station apparatus B (301). In the stage of #slot2, the mobile station apparatus B does not request MIMO-SDM communication, and only resources to transmit the reception quality are allocated every four slots.

The uplink data occurs in #slot2, and grant of data transmission is given in L1/L2 grant from the base station apparatus A (302). In this slot, since the resources to transmit the reception quality information are allocated in the processing of #slot1, in L1/L2 grant (302) are allocated resources to concurrently transmit the uplink data and reception quality information. The mobile station apparatus B includes the uplink data and the reception quality information to transmit on the data channel assigned by L1/L2 grant (303). In addition, the resources for reception quality information transmission allocated by the processing of #slot1 are released when L1/L2 grant (302) occurs.

In #slot4, uplink data occurs, and in this slot, the feedback information is not transmitted. In this case, the mobile station apparatus B transmits the uplink data (305), using resources allocated by L1/L2 grant (304).

Slot6 corresponds to a period to transmit the reception quality information, and resources to transmit the information are allocated to the mobile station apparatus B by the processing in #slot1. In this slot, the mobile station apparatus B is capable of performing MIMO-SDM communication, and makes a request to perform MIMO-SDM communication to the base station apparatus A. The mobile station apparatus B includes the reception quality information and a signal of MIMO communication request, and transmits the signal with resources allocated in the processing #slot1 (306). In addition, the MIMO communication request does not need to be transmitted always concurrently with the reception quality information, and its resources may be reserved by L1/L2 grant.

In #slot8, the base station apparatus A grants the MIMO communication request transmitted from the mobile station apparatus B, and includes transmission parameters of the feedback information (transmission signal precoding information and transmission signal number-of-sequence information) required for the mobile station apparatus to perform MIMO communication and the reception quality information, and information about long-term resource allocation to transmit each of the feedback information in RRC signaling to transmit to the mobile station apparatus B (307).

By this means, starting from #slot10, to the mobile station apparatus B are allocated transmission resources of the reception quality information with a period of four slots, transmission resources of the transmission signal precoding information with a period of three slots, and transmission resources of the transmission signal number-of-sequence information with a period of six slots. In addition, all of the channels for allocated resources are the uplink data channel (PUSCH), but the uplink control channel (PUCCH) may be assigned.

In #slot10, uplink data occurs, and grant of data transmission is given in L1/L2 grant from the base station apparatus A (308). Herein, the mobile station apparatus B concurrently transmits the reception quality information, transmission signal precoding information, transmission signal number-of-sequence information and uplink data to the base station apparatus A with resources allocated by L1/L2 grant (309). Herein, the resources to transmit the feedback information allocated in the processing of #slot8 are released when L1/L2 grant (308) occurs. This processing is the same as in #slot13, the transmission signal precoding information and uplink data is concurrently transmitted with resources given by L1/L2 grant (310), and released are transmission resources to transmit the transmission signal precoding information allocated in the processing of #slot8.

In #slot14 and #slot18, the mobile station apparatus B transmits only the reception quality information to the base station apparatus A (312, 314). Resources used in the transmission are resources on the uplink data channel allocated in #slot8. This processing is the same as in #slot16 and #slot19.

As described above, according to Embodiment 3 of the invention, the mobile station apparatus B is able to request a change in the feedback information to send to the base station apparatus A in response to a change in propagation conditions, and corresponding thereto, the base station apparatus A is capable of selecting/canceling the feedback information and optimizing the period in response to the conditions. By this means, the mobile station apparatus B is able to transmit each of the feedback information to the base station apparatus A on an optimal channel with an optimal period, efficient schedule allocation is made ease in the base station apparatus A, and it is possible to actualize optimal transmission control.

In addition, in this Embodiment, a request to increase the information for feedback is made in starting MIMO communication, but in contrast thereto, it is possible to make a request to decrease the information for feedback to halt MIMO communication. Further, in this Embodiment, resource allocation is made using a request from the mobile station apparatus as a trigger, but may be made by determination of the base station apparatus based on information that the base station apparatus is capable of measuring, or information indicative of a rate of the change in propagation path transmitted from the mobile station apparatus. The information indicative of the rate of the change in propagation path may be transmitted to the base station apparatus periodically as one of the feedback information.

Figure 5A:
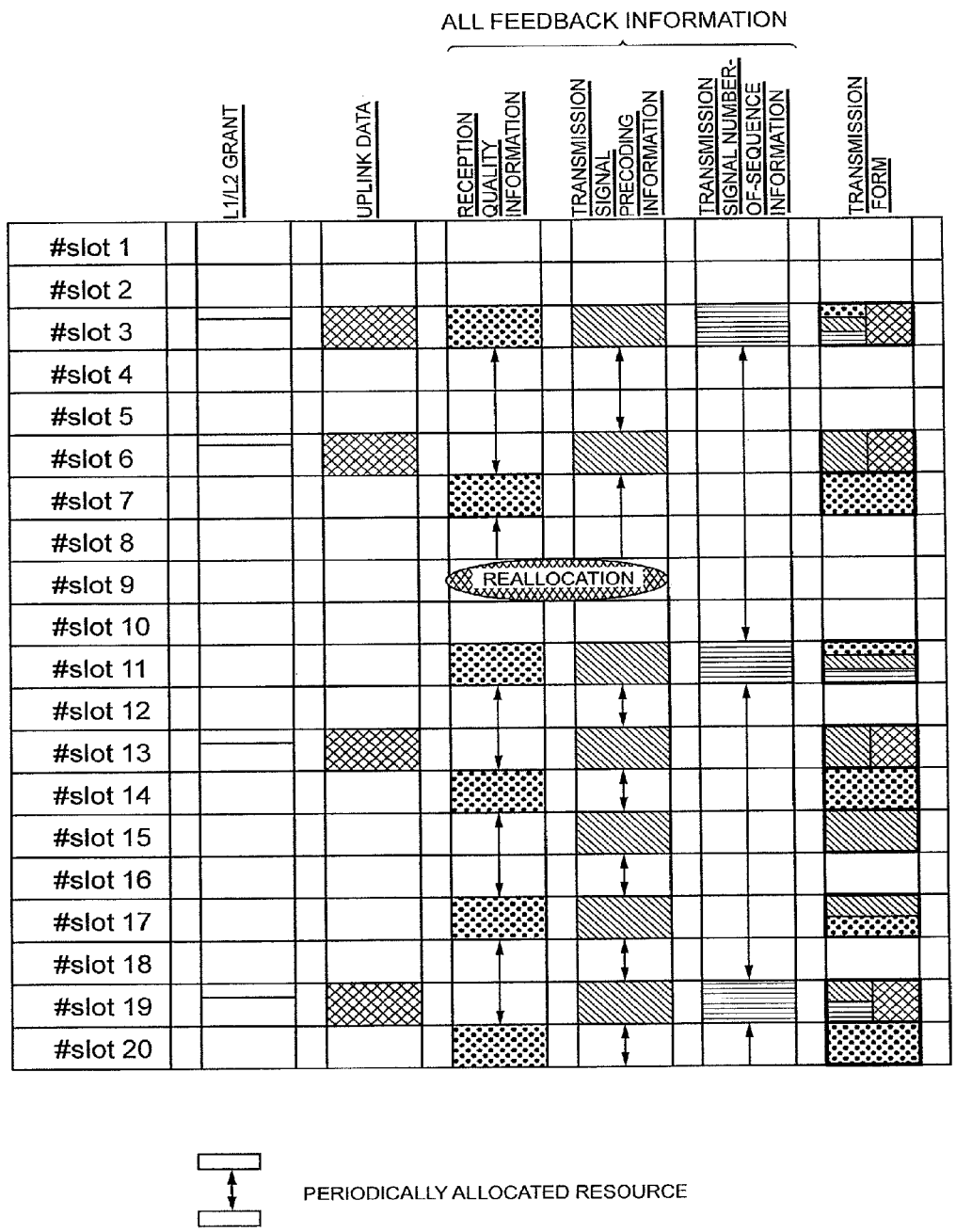
FIG. 5A is a diagram showing an operation example of a mobile communication system according to Embodiment 4.
Figure 5B:
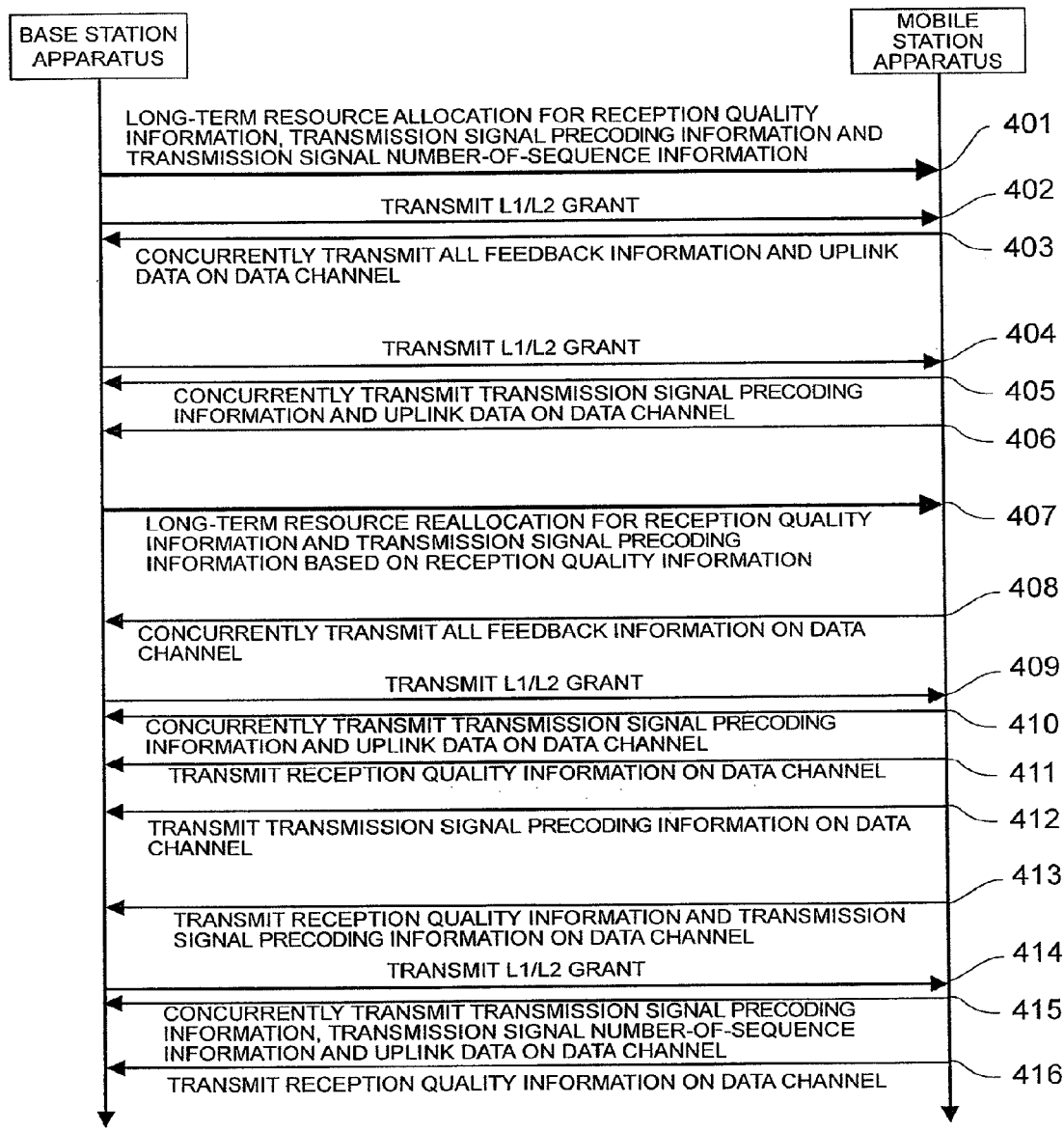
FIG. 5B is another diagram showing the operation example of the mobile communication system according to Embodiment 4.

A mobile communication system according to a fourth embodiment (Embodiment 4) of the invention will be described below with reference to drawings. FIGS. 5A and 5B are diagrams showing an operation example of the mobile communication system according to Embodiment 4.

FIG. 5A shows control signals transmitted to the mobile station apparatus B from the base station apparatus A, uplink data and feedback information transmitted to the base station apparatus A from the mobile station apparatus B, and their transmission forms. Further, FIG. 5B shows a sequence chart of operations of the base station apparatus and mobile station apparatus. FIGS. 5A and 5B show the operations of from #slot1 to #slot20 as an example.

In this embodiment, such a case is assumed that the communication path changes due to a reason of moving of the mobile station apparatus B or the like during communications between the base station apparatus A and mobile station apparatus B and that the period to transmit each of the feedback information is varied. A significant difference from the processing flow as shown in FIGS. 2A and 2B is that the optimal transmission periods of the reception quality information and transmission signal precoding information are changed in the mobile station apparatus B after only resources to transmit the reception quality information are allocated in #slot2, and that the base station apparatus A performs reallocation based on the reception quality information of #slot7. This reallocation processing is executed in #slot9.

The operation in each slot in Embodiment 4 of the invention will be described below with reference to FIGS. 5A and 5B. First, in #slot2, the base station apparatus A includes parameters used in transmitting the reception quality information, and information about long-term resource allocation to transmit the feedback information (reception quality information, transmission signal precoding information and transmission signal number-of-sequence information) in RRC signaling to transmit to the mobile station apparatus B (401). By this processing, starting from #slot3, the base station apparatus A allocates resources to transmit the reception quality information with a period of four slots, resources to transmit the transmission signal precoding information with a period of three slots, and resources to transmit the transmission signal number-of-sequence information with a period of eight slots. In a slot to concurrently transmit a plurality of feedback information among the feedback information, resources continuous on the frequency axis are allocated. These allocated resources are assumed to be all assigned to the uplink data channel, but may be assigned to the uplink control channel when necessary.

In #slot3, the mobile station apparatus B transmits the uplink data and all of the feedback information. At this point, the same processing is performed as in #slot5 in Embodiment 1 (FIGS. 2A and 2B) (402, 403). In #slot6, the mobile station apparatus B transmits the uplink data and transmission signal precoding information. At this point, the same processing is performed as in #slot8 in Embodiment 1 (FIGS. 2A and 2B) (404, 405). In #slot7, the mobile station apparatus B transmits the reception quality information. The same processing is performed as in #slot9 in Embodiment 1 (FIGS. 2A and 2B) (406).

In #slot9, the base station apparatus A performs reallocation of resources to transmit the reception quality information and transmission signal precoding information based on the reception quality information received in #slot7. The base station apparatus A includes parameters used in transmitting the reception quality information, and information about long-term resource allocation to transmit the feedback information (reception quality information and transmission signal precoding information) in RRC signaling to transmit to the mobile station apparatus B (407). By this processing, starting from #slot11, the base station apparatus A allocates resources to transmit the reception quality information with a period of three slots, and resources to transmit the transmission signal precoding information with a period of two slots. Herein, the base station apparatus A releases resources of the reception quality information and transmission signal precoding information allocated in #slot2, but resources of the transmission signal number-of-sequence information are not changed. Further, in a slot to concurrently transmit a plurality of feedback information among the feedback information, resources continuous on the frequency axis are allocated. These allocated resources are assumed to be all assigned to the uplink data channel, but may be assigned to the uplink control channel when necessary.

For #slot11 and subsequent slots, communication is performed using resources allocated in #slot9 and resources given transmission grant by L1/L2 grant, and this processing is the same as in Embodiment 1.

As described above, according to Embodiment 4 of the invention, the mobile station apparatus B transmits the reception quality information corresponding to a change in propagation conditions, and is thereby capable of requesting a change in the feedback information to the base station apparatus A, and in response thereto, the base station apparatus A is able to set whether or not to adopt the feedback information, and further set the optimal transmission period. By this means, the mobile station apparatus B is able to transmit each of the feedback information to the base station apparatus A on an optimal channel with an optimal period, the base station apparatus A is able to perform efficient resource allocation, and it is possible to actualize efficient transmission control.

In this Embodiment, the reception quality information and transmission signal precoding information undergoes resource reallocation, but feedback information targeted for reallocation is not limited thereto. Further, in this Embodiment, resource allocation is made using a request from the mobile station apparatus as a trigger, but may be made by determination of the base station apparatus based on information that the base station apparatus is capable of measuring, measurement information transmitted from the mobile station apparatus or the like.

Figure 6A:
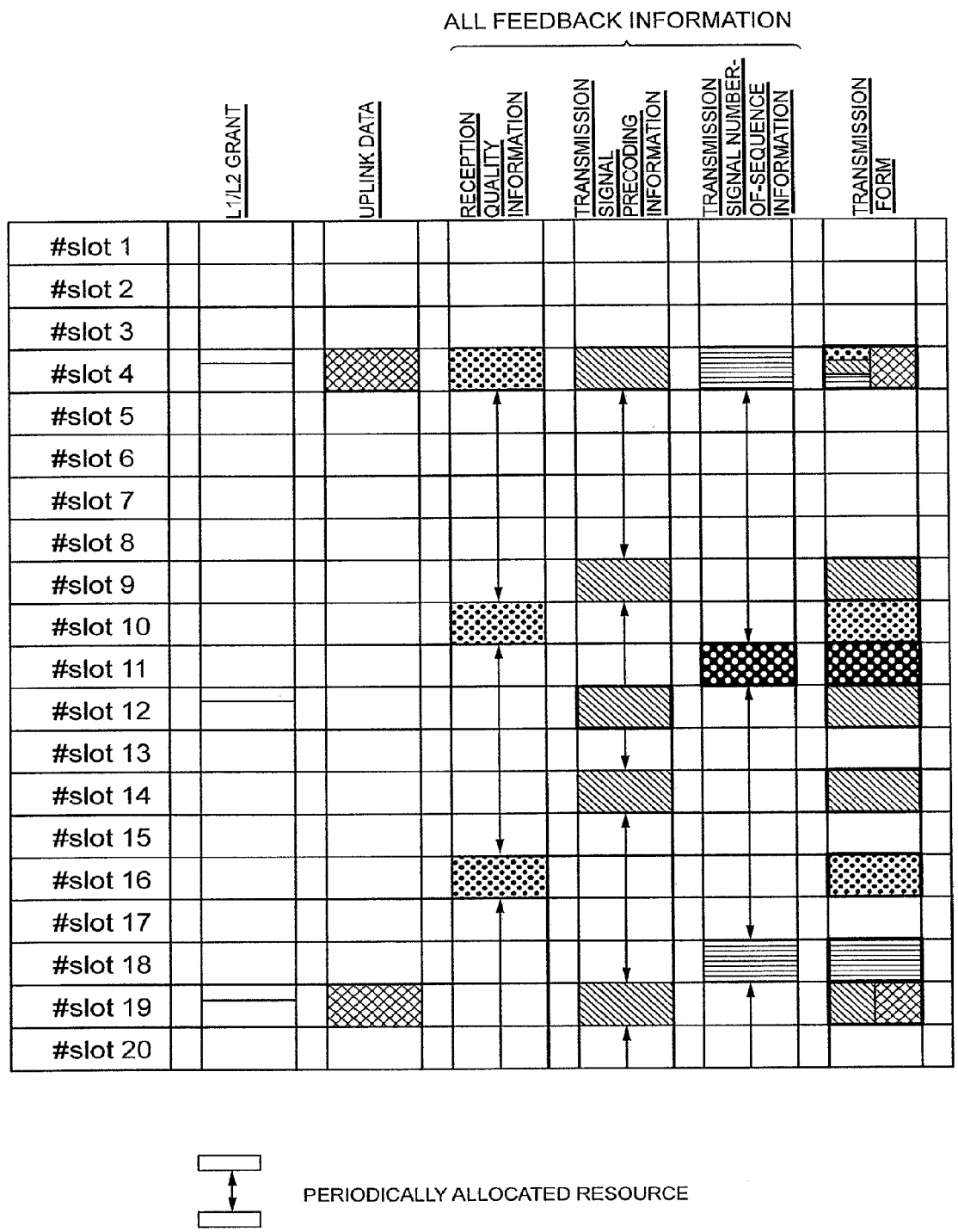
FIG. 6A is a diagram showing an operation example of a mobile communication system according to Embodiment 5.
Figure 6B:
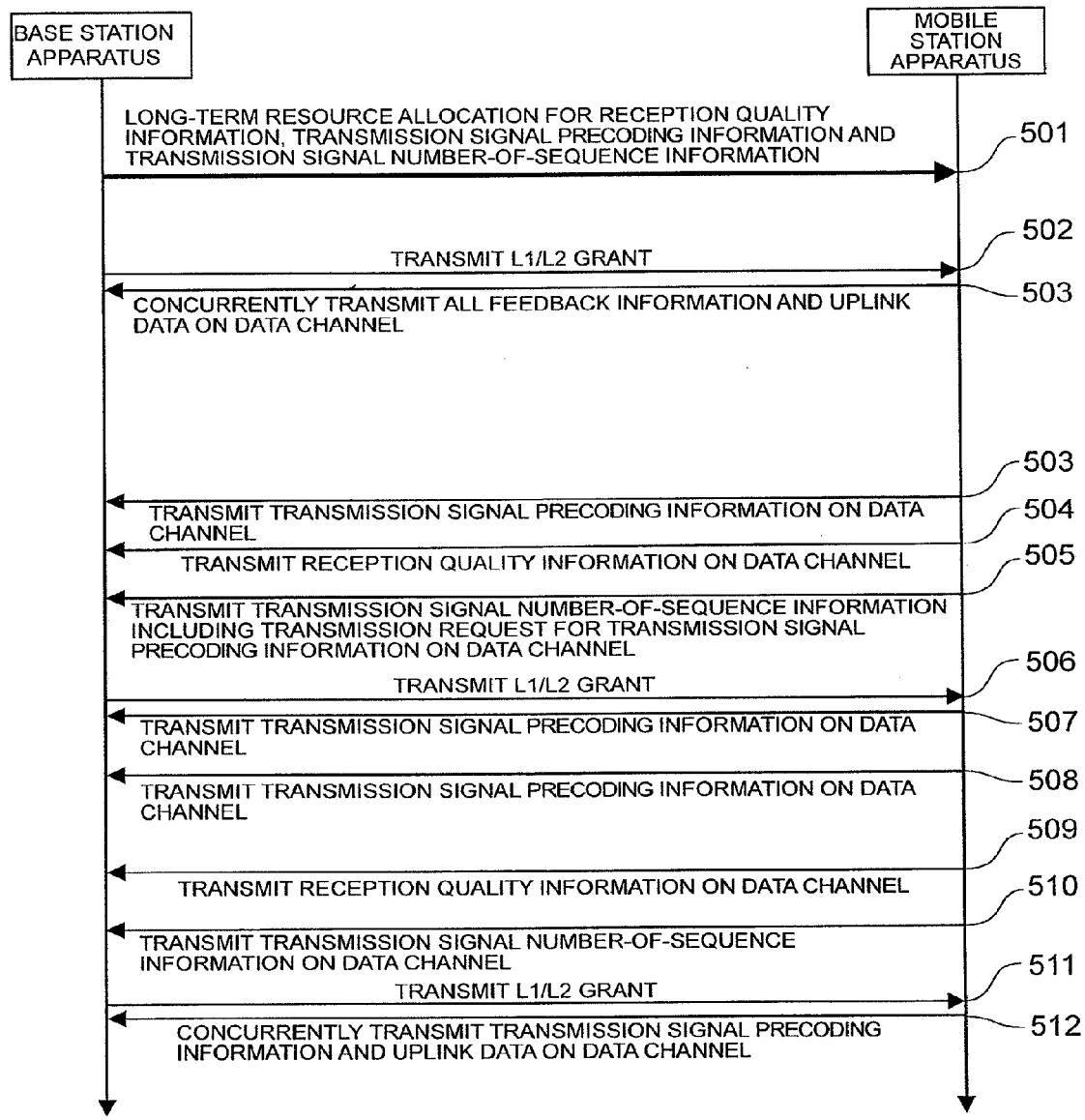
FIG. 6B is another diagram showing the operation example of the mobile communication system according to Embodiment 5.

A mobile communication system according to a fifth (Embodiment 5) of the invention will be described below with reference to drawings. FIGS. 6A and 6B are diagrams showing an operation example of the mobile communication system according to Embodiment 5. FIG. 6A shows control signals transmitted to the mobile station apparatus B from the base station apparatus A, uplink data and feedback information transmitted to the base station apparatus A from the mobile station apparatus B, and their transmission forms. Further, FIG. 6B shows a sequence chart of operations of the base station apparatus and mobile station apparatus. FIGS. 6A and 6B show the operations of from #slot1 to #slot20 as an example.

In this embodiment, it is assumed that such a situation occurs that the transmission signal precoding information should be transmitted immediately in #slot10 due to a sudden change in propagation path or the like after the base station apparatus A allocates resources to the mobile station apparatus B to transmit each of the feedback information periodically. A significant difference from the processing flow as shown in FIGS. 2A and 2B is that the mobile station apparatus B requests resources to temporarily transmit the transmission signal precoding information in #slot11, and that the resources are allocated in #slot12.

The operation in each slot in Embodiment 5 of the invention will be described below with reference to FIGS.

6A and 6B. First, in #slot2, the base station apparatus A includes parameters used in transmitting the reception quality information, and information about long-term resource allocation to transmit the feedback information (reception quality information, transmission signal precoding information and transmission signal number-of-sequence information) in RRC signaling to transmit to the mobile station apparatus B (501). By this processing, starting from #slot4, the base station apparatus A allocates resources to transmit the reception quality information with a period of six slots, resources to transmit the transmission signal precoding information with a period of five slots, and resources to transmit the transmission signal number-of-sequence information with a period of seven slots.

In a slot to concurrently transmit a plurality of feedback information among the feedback information, resources continuous on the frequency axis are allocated. These allocated resources are assumed to be all assigned to the uplink data channel, but may be assigned to the uplink control channel when necessary.

Since the transmission signal precoding information changes greatly in #slot10, the mobile station apparatus B transmits a signal including a transmission request for the transmission signal precoding information in the transmission signal number-of-sequence information in #slot11 on the data channel (505). Upon receiving the signal, the base station apparatus A allocates temporal resources to transmit the transmission signal precoding information to the mobile station apparatus B. This processing is achieved by L1/L2 grant in #slot12 (506), and upon receiving L1/L2 grant, the mobile station apparatus B transmits the transmission signal precoding information on the data channel using the resources assigned by L1/L2 grant (507).

For the processing of slots except the above-mentioned slot, communication is performed using resources allocated in #slot2 and resources given transmission grant by L1/L2 grant, and this processing is the same as in Embodiment 1.

As described above, according to Embodiment 5 of the invention, the mobile station apparatus B is capable of transmitting the feedback information corresponding to a change in environment in the mobile station apparatus B at timing that is not a period assigned by the base station apparatus A. For a request transmitted from the mobile station apparatus B, since the base station apparatus A is capable of determining whether or not to grant the request, it is possible to perform processing for improving throughput while schedule is being concentrated on the base station apparatus A to control, and it is thereby possible to achieve more optimal transmission control.

Herein, in this embodiment, resource reallocation is performed on the transmission signal precoding information, but targeted feedback information is not limited thereto. Further, a transmission request for the transmission signal precoding information is not limited to be included in the feedback information to transmit, and can be transmitted together with the uplink data and other uplink signal, or can be transmitted with resources to transmit the request reserved. This processing may be made by determination of the base station apparatus based on information that the base station apparatus is capable of measuring, or information indicative of a rate of the change in propagation path transmitted from the mobile station apparatus. The information indicative of the rate of the change in propagation path may be transmitted to the base station apparatus periodically as one of the feedback information.

Figure 9A:
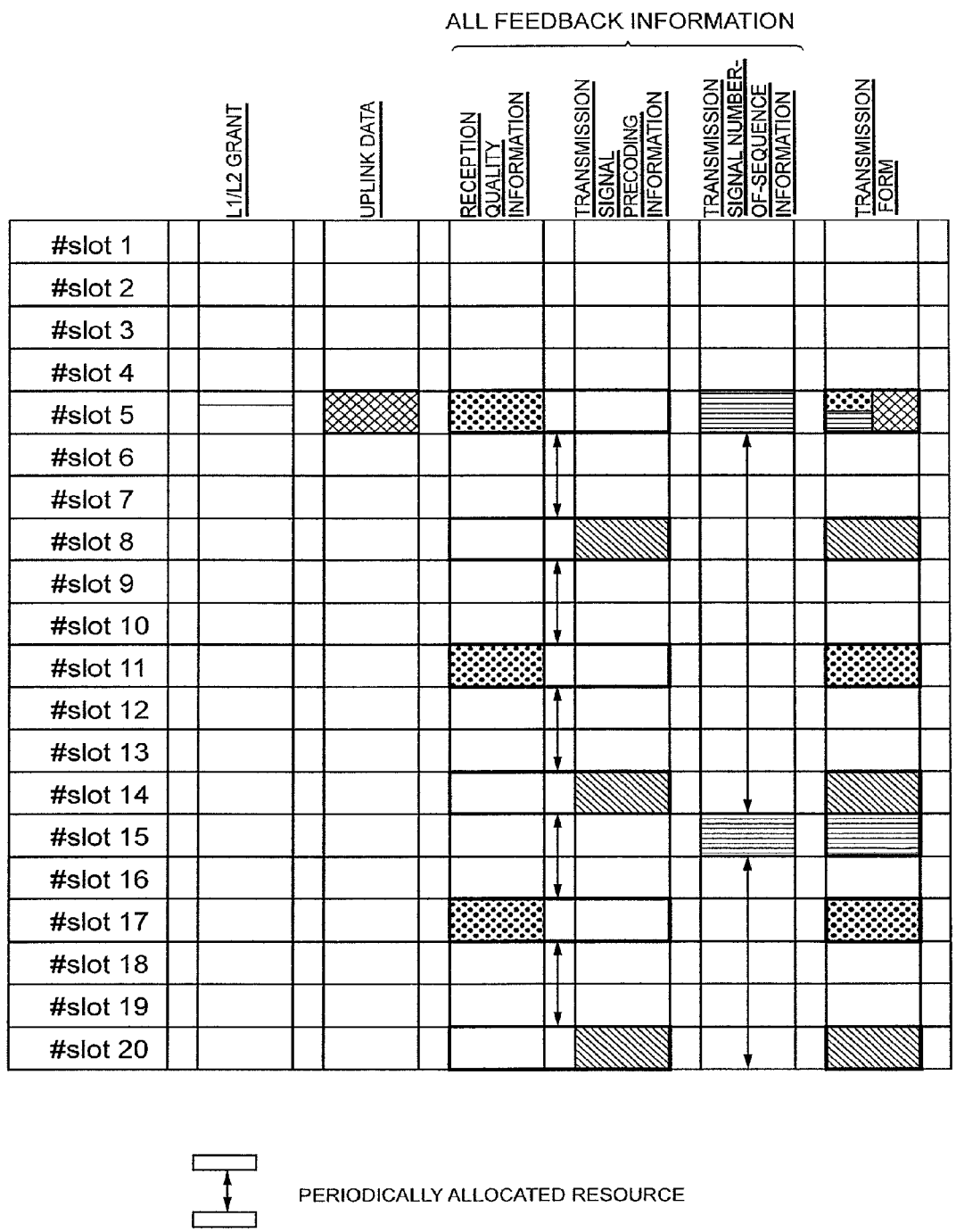
FIG. 9A is a diagram showing an operation example of a mobile communication system according to Embodiment 6.
Figure 9B:
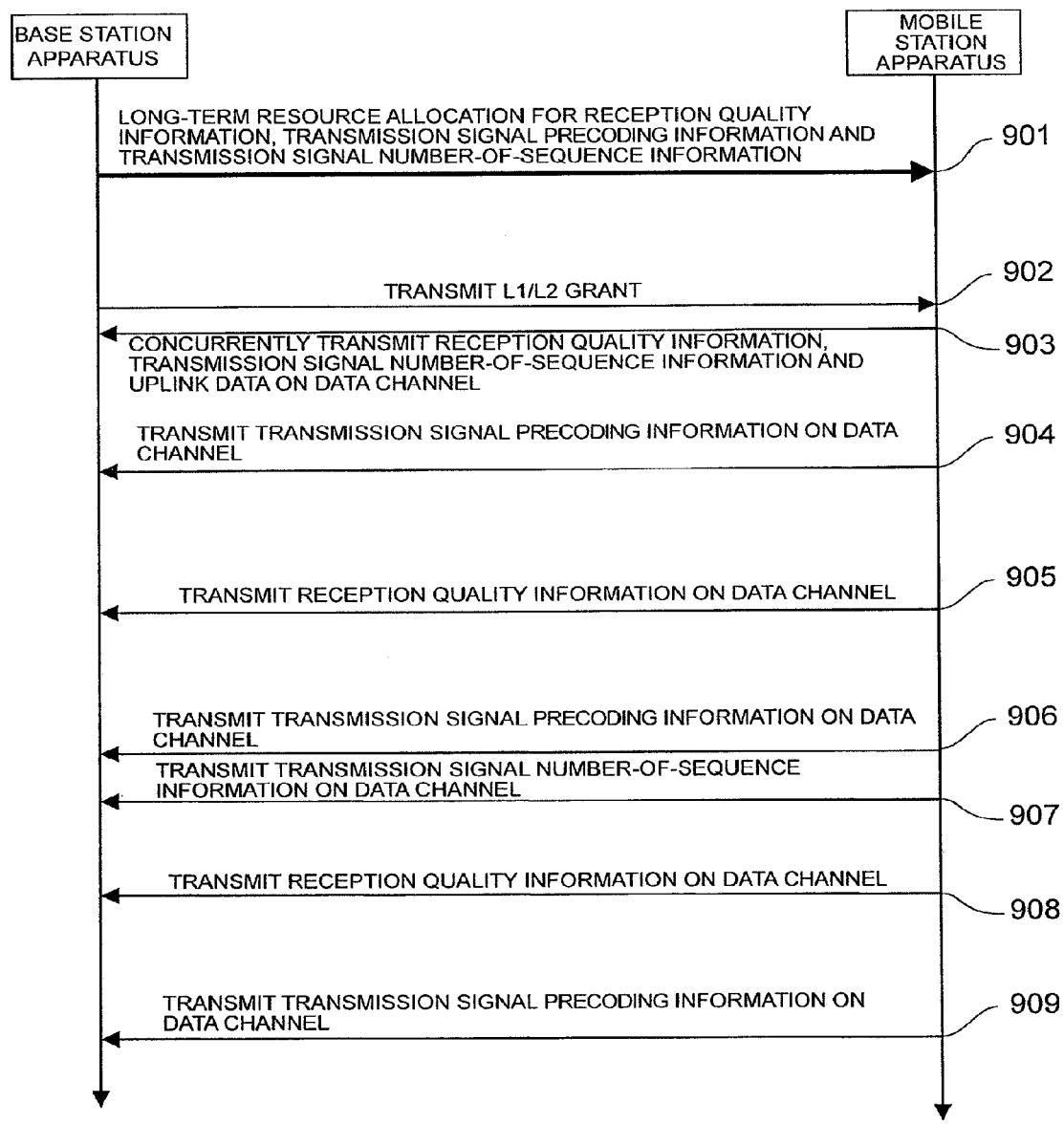
FIG. 9B is another diagram showing the operation example of the mobile communication system according to Embodiment 6.

A mobile communication system according to a sixth embodiment (Embodiment 6) of the invention will be described below with reference to drawings. FIGS. 9A and 9B are diagrams showing an operation example of the mobile communication system according to Embodiment 6. FIG. 9A shows control signals transmitted to the mobile station apparatus B from the base station apparatus A, uplink data and feedback information transmitted to the base station apparatus A from the mobile station apparatus B, and their transmission forms. Further, FIG. 9B shows a sequence chart of operations of the base station apparatus and mobile station apparatus. FIGS. 9A and 9B show the operations of from #slot1 to #slot20 as an example.

A difference between this Embodiment and Embodiment 1 is that the same resources are allocated while setting the reception quality information and transmission signal precoding information as a group. In this case, the transmission period is the same in the reception quality information and transmission signal precoding information, and by shifting the transmission timing, the mobile station apparatus alternately transmits the information to the base station apparatus as feedback.

Described below is the operation in each slot in Embodiment 6 of the invention. In #slot2, the base station apparatus A includes parameters used in transmitting the reception quality information, and information about long-term resource allocation to transmit the feedback information (reception quality information, transmission signal precoding information and transmission signal number-of-sequence information) in RRC signaling to transmit to the mobile station apparatus B (901). By this processing, starting from #slot5, the base station apparatus A allocates resources to transmit the reception quality information with a period of six slots, and resources to transmit the transmission signal precoding information with a period of six slots. In addition, these pieces of information have the same period, are thereby handled as a group, and are assigned resources with a period of three slots that are shared by the reception quality information and transmission signal precoding information. In these resources, as shown in FIGS. 9A and 9B, the reception quality information and transmission signal precoding information is alternately transmitted. Then, resources to transmit the transmission signal number-of-sequence information are allocated with a period of ten slots.

In #slot5, uplink data occurs, and resources are allocated by L1/L2 grant (902). Using the resources, the mobile station apparatus transmits the uplink data, reception quality information and transmission signal number-of-sequence information (903). In #slot8, it is a turn to transmit the transmission signal precoding information, and using resources allocated to the reception quality information and transmission signal number-of-sequence information allocated in #slot2, the transmission signal precoding information is transmitted (904). In #slot11, it is a turn to transmit the reception quality information, and using resources allocated to the reception quality information and transmission signal number-of-sequence information, the reception quality information is transmitted (905). This processing is the same as in #slot14, #slot17 and #slot20 (906, 908, 909). In #slot15, the transmission signal number-of-sequence information is transmitted using resources allocated in #slot2 (907).

As described above, according to Embodiment 6 of the invention, by regarding pieces of feedback information assigned the same period as a group, it is possible to simplify resource allocation. It is thereby possible to reduce redundant signaling.

Herein, in this Embodiment, resource allocation is made by combining the reception quality information and transmission signal precoding information as a group, but targeted feedback information is not limited thereto. Further, in this Embodiment, allocated resources are alternately used for two kinds of feedback information, but it is not necessary to transmit a single kind of feedback information in a single slot, and it is also possible to transmit a plurality of kinds of feedback information in a single slot or divide the feedback information to transmit in a plurality of slots.

In the foregoing, each of the Embodiments of the invention describes using the reception quality information, transmission signal precoding information and transmission signal number-of-sequence information as examples to transmit with different periods, but all the pieces of information does not need to always undergo scheduling with different periods, and may be subjected to scheduling with the same period and sent with same resources as feedback.

Further, in each of the Embodiments of the invention, the uplink data channel (PUSCH) or uplink control channel (PUCCH) is explicitly assigned as a channel to transmit the reception quality information, transmission signal precoding information and transmission signal number-of-sequence information, but the invention is not limited in the type of channel to assign.

Furthermore, each of the Embodiments of the invention gives explanations using the reception quality information, transmission signal precoding information and transmission signal number-of-sequence information as examples, but kinds of feedback information applied in the invention are not limited thereto, and the invention is applicable to other kinds of feedback information in the same procedures.

Moreover, each of the Embodiments of the invention is described specifically with reference to drawings, but specific constitutions are not limited to the Embodiments, and designs and others in the scope without departing from the subject matter of the invention are included in the scope of the claims.

What is claimed is:

1. An apparatus comprising:
    a processor; and
    a computer-readable storage medium coupled to the processor and storing a program to be executed by the processor, the program including instructions for assigning same periodical physical uplink control channel resources for transmissions of a first group feedback information and a second group feedback information, a first periodicity corresponding to the first group feedback information and a second periodicity corresponding to the second group feedback information; and
    a transmitter, configured to transmit, through radio resource control (RRC) signaling, a transmission parameter indicating the first periodicity and the second periodicity and information of the periodical physical uplink control channel resources,
    wherein the first group feedback information includes reception quality information and transmission signal precoding information;
    wherein the second group feedback information includes transmission signal sequence information indicative of a number of transmission sequences communicable with a mobile station apparatus; and
    wherein the first periodicity and the second periodicity have different periods, and the reception quality information and the transmission signal precoding information are periodically transmitted using a same period.

2. The apparatus according to claim 1, wherein the periodical physical uplink control channel resources are defined by resource blocks.

3. The apparatus according to claim 1, wherein the periodical physical uplink control channel resources are defined by codes.

4. A method comprising:
    assigning, by a processor of a network side, same periodical physical uplink control channel resources for transmissions of a first group feedback information and a second group feedback information, a first periodicity corresponding to the first group feedback information and a second periodicity corresponding to the second group feedback information, and
    transmitting, by a transmitter of the network side, through radio resource control (RRC) signaling, a transmission parameter indicating the first periodicity and the second periodicity and information indicating the periodical physical uplink control channel resources;
    wherein the first group feedback information includes a reception quality information and transmission signal precoding information;
    wherein the second group feedback information includes transmission signal sequence information indicative of a number of transmission sequences communicable with a mobile station apparatus; and
    wherein the first periodicity and the second periodicity have different periods and the reception quality information and the transmission signal precoding information are periodically transmitted using a same period.

5. The method according to claim 4, wherein the periodical physical uplink control channel resources are defined by resource blocks.

6. The method according to claim 4, wherein the periodical physical uplink control channel resources are defined by codes.

7. An apparatus comprising:
    a receiver, configured to receive a transmission parameter indicating a first periodicity and a second periodicity and information indicating periodical physical uplink control channel resources; and
    a transmitter, configured to transmit a first group feedback information and a second group feedback information according to the first periodicity and the second periodicity, respectively, on the periodical physical uplink control channel resources;
    wherein the first group feedback information includes reception quality information and transmission signal precoding information;
    wherein the second group feedback information includes transmission signal sequence information indicative of a number of transmission sequences communicable with a mobile station apparatus; and
    wherein the first periodicity and the second periodicity have different periods, and the reception quality information and the transmission signal precoding information are periodically transmitted using a same period.

8. The apparatus according to claim 7, wherein the periodical physical uplink control channel resources are defined by resource blocks.

9. The apparatus according to claim 7, wherein the periodical physical uplink control channel resources are defined by codes.

10. A method comprising:
    receiving, by a receiver of a terminal side, a transmission parameter indicating a first periodicity and a second periodicity and information indicating periodical physical uplink control channel resources; and transmitting, by a transmitter of the terminal side, a first group feedback information and a second group feedback information according to the first periodicity and the second periodicity, respectively, on the periodical physical uplink control channel resources;

wherein the first group feedback information includes a reception quality information and transmission signal precoding information;

wherein the second group feedback information includes transmission signal sequence information indicative of a number of transmission sequences communicable with a mobile station apparatus; and wherein the first periodicity and the second periodicity have different periods, and the reception quality information and the transmission signal precoding information are periodically transmitted using a same period.

11. The method according to claim 10, wherein the periodical physical uplink control channel resources are defined by resource blocks.

12. The method according to claim 10, wherein the periodical physical uplink control channel resources are defined by codes.

* * * * *